US008594814B2

(12) United States Patent
Rovaglio et al.

(10) Patent No.: US 8,594,814 B2
(45) Date of Patent: Nov. 26, 2013

(54) SYSTEMS AND METHODS FOR IMMERSIVE INTERACTION WITH ACTUAL AND/OR SIMULATED FACILITIES FOR PROCESS, ENVIRONMENTAL AND INDUSTRIAL CONTROL

(75) Inventors: Maurizio Rovaglio, Ripalta Cremasca (IT); Tobias Scheele, Irvine, CA (US)

(73) Assignee: Invensys Systems, Inc., Foxboro, MA (US)

( * ) Notice: Subject to any disclaimer, the term of this patent is extended or adjusted under 35 U.S.C. 154(b) by 778 days.

(21) Appl. No.: 12/487,792

(22) Filed: Jun. 19, 2009

(65) Prior Publication Data
US 2009/0319058 A1  Dec. 24, 2009

Related U.S. Application Data

(60) Provisional application No. 61/074,472, filed on Jun. 20, 2008, provisional application No. 61/155,160, filed on Feb. 25, 2009.

(51) Int. Cl.
*G06F 19/00* (2011.01)
(52) U.S. Cl.
USPC ............... 700/83; 700/17; 700/97; 345/419; 715/848
(58) Field of Classification Search
USPC ............... 700/83, 17, 97, 98; 715/848–852; 345/418–421
See application file for complete search history.

(56) References Cited

U.S. PATENT DOCUMENTS 3,096,434 A   7/1963 King
3,404,264 A   10/1968 Kugler
(Continued)

FOREIGN PATENT DOCUMENTS

EP   0411869 A2   2/1991
EP   0592921      4/1994
(Continued)

OTHER PUBLICATIONS

U.S. Appl. No. 09/721,409, filed Nov. 21, 2000, Venkatraman et al.
(Continued)

*Primary Examiner* — Kavita Padmanabhan
*Assistant Examiner* — Douglas Lee
(74) *Attorney, Agent, or Firm* — Edward S. Jarmolowicz, Esq.

(57) ABSTRACT

The invention provides, in some aspects, systems for interaction with a control environment that includes controlled equipment along with control devices that monitor and control that controlled equipment. According to some of those aspects, such a system includes first functionality that generates output representing an operational status of the controlled equipment, as well as second functionality that generates output representing an operational of one or more of the control devices. An engine coordinates the first functionality and to the second functionality to generate an operational status of the control environment. A virtual reality environment generates, as a function of that operational status and one or more physical aspects of the control environment, a three-dimensional ("3D") display of the control environment. The virtual reality environment is responsive to user interaction with one or more input devices to generate the 3D display so as to permit the user to interact with at least one of the control devices and the controlled equipment at least as represented by the 3D display of the control environment. The engine applies to at least one of the first and second functionality indicia of those interactions to discern resulting changes in the operational status of the control environment. It applies indicia of those changes to the virtual reality environment to effect corresponding variation in the 3D display of the control environment—i.e., variation indicative of the resulting change in the control environment.

30 Claims, 4 Drawing Sheets

(56) References Cited

U.S. PATENT DOCUMENTS

| | | |
|---|---|---|
| 3,665,172 A | 5/1972 | Spaargaren et al. |
| 3,701,280 A | 10/1972 | Stroman |
| 3,802,590 A | 4/1974 | Culver |
| 3,810,119 A | 5/1974 | Zieve et al. |
| 3,825,905 A | 7/1974 | Allen, Jr. |
| 3,959,772 A | 5/1976 | Wakasa et al. |
| 4,006,464 A | 2/1977 | Landell |
| RE29,383 E | 9/1977 | Gallatin et al. |
| 4,058,975 A | 11/1977 | Gilbert et al. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,351,023 A | 9/1982 | Richer |
| 4,377,000 A | 3/1983 | Staab |
| 4,410,942 A | 10/1983 | Milligan et al. |
| 4,413,314 A | 11/1983 | Slater et al. |
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe |
| 4,612,620 A | 9/1986 | Davis et al. |
| 4,615,001 A | 9/1986 | Hudgins, Jr. |
| 4,628,437 A | 12/1986 | Poschmann et al. |
| 4,633,217 A | 12/1986 | Akano |
| 4,639,852 A | 1/1987 | Motomiya |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita |
| 4,770,841 A | 9/1988 | Haley et al. |
| 4,790,762 A | 12/1988 | Harms et al. |
| 4,800,512 A | 1/1989 | Busch |
| 4,805,107 A | 2/1989 | Kieckhafer et al. |
| 4,806,905 A | 2/1989 | McGowan, III et al. |
| 4,816,996 A | 3/1989 | Hill et al. |
| 4,817,094 A | 3/1989 | Lebizay et al. |
| 4,839,854 A | 6/1989 | Sakami et al. |
| 4,872,106 A | 10/1989 | Slater |
| 4,885,707 A | 12/1989 | Nichol et al. |
| 4,896,290 A | 1/1990 | Rhodes et al. |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,924,462 A | 5/1990 | Sojka |
| 4,926,158 A | 5/1990 | Zeigler |
| 4,934,196 A | 6/1990 | Romano |
| 4,940,974 A | 7/1990 | Sojka |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,076 A | 2/1991 | Zifferer et al. |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,089,927 A | 2/1992 | Bulan et al. |
| 5,089,974 A | 2/1992 | Demeyer et al. |
| 5,109,692 A | 5/1992 | Fitzgerald |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A | 9/1992 | Badavas |
| 5,151,930 A | 9/1992 | Hagl |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,167,009 A | 11/1992 | Skeirik |
| 5,168,276 A | 12/1992 | Huston et al. |
| 5,168,441 A | 12/1992 | Onarheim et al. |
| 5,170,340 A | 12/1992 | Prokop et al. |
| 5,175,698 A | 12/1992 | Barbanell |
| 5,175,829 A | 12/1992 | Stumpf et al. |
| 5,181,978 A | 1/1993 | Ochiai |
| 5,193,175 A | 3/1993 | Cutts, Jr. et al. |
| 5,197,114 A | 3/1993 | Skeirik |
| 5,202,961 A | 4/1993 | Mills et al. |
| 5,212,784 A | 5/1993 | Sparks |
| 5,218,187 A | 6/1993 | Koenck et al. |
| 5,224,203 A | 6/1993 | Skeirik |
| 5,233,615 A | 8/1993 | Goetz |
| 5,245,704 A | 9/1993 | Weber et al. |
| 5,249,274 A | 9/1993 | Sztipanovits et al. |
| 5,251,125 A | 10/1993 | Karnowski et al. |
| 5,255,367 A | 10/1993 | Bruckert et al. |
| 5,257,208 A | 10/1993 | Brown et al. |
| 5,258,999 A | 11/1993 | Wernimont et al. |
| 5,271,013 A | 12/1993 | Gleeson |
| 5,276,901 A | 1/1994 | Howell et al. |
| 5,283,729 A | 2/1994 | Lloyd |
| 5,289,365 A | 2/1994 | Caldwell et al. |
| 5,291,390 A | 3/1994 | Satou |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse |
| 5,307,372 A | 4/1994 | Sawyer et al. |
| 5,307,463 A | 4/1994 | Hyatt et al. |
| 5,309,556 A | 5/1994 | Sismilich |
| 5,310,998 A | 5/1994 | Okuno |
| 5,317,726 A | 5/1994 | Horst |
| 5,325,339 A | 6/1994 | Yost et al. |
| 5,327,144 A | 7/1994 | Stilp et al. |
| 5,335,186 A | 8/1994 | Tarrant |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |

(56) References Cited

U.S. PATENT DOCUMENTS

| | | |
|---|---|---|
| 5,349,343 A | 9/1994 | Oliver |
| 5,349,678 A | 9/1994 | Morris et al. |
| 5,352,033 A | 10/1994 | Gresham et al. |
| 5,353,217 A | 10/1994 | Berghs et al. |
| 5,359,721 A | 10/1994 | Kempf et al. |
| 5,361,198 A | 11/1994 | Harmon et al. |
| 5,367,640 A | 11/1994 | Hamilton et al. |
| 5,371,895 A | 12/1994 | Bristol |
| 5,377,315 A | 12/1994 | Leggett |
| 5,381,529 A | 1/1995 | Matsushima |
| 5,384,910 A | 1/1995 | Torres |
| 5,386,373 A | 1/1995 | Keeler et al. |
| 5,386,417 A | 1/1995 | Daugherty et al. |
| 5,390,321 A | 2/1995 | Proesel |
| 5,392,280 A | 2/1995 | Zheng |
| 5,392,389 A | 2/1995 | Fleming |
| 5,394,522 A | 2/1995 | Sanchez-Frank et al. |
| 5,398,331 A | 3/1995 | Huang et al. |
| 5,400,140 A | 3/1995 | Johnston |
| 5,405,779 A | 4/1995 | McCabe et al. |
| 5,408,603 A | 4/1995 | Van de Lavoir et al. |
| 5,410,141 A | 4/1995 | Koenck et al. |
| 5,410,492 A | 4/1995 | Gross et al. |
| 5,410,717 A | 4/1995 | Floro |
| 5,420,977 A | 5/1995 | Sztipanovits et al. |
| 5,421,017 A | 5/1995 | Scholz et al. |
| 5,422,816 A | 6/1995 | Sprague et al. |
| 5,426,732 A | 6/1995 | Boies et al. |
| 5,428,734 A | 6/1995 | Haynes et al. |
| 5,428,769 A | 6/1995 | Glaser et al. |
| 5,428,781 A | 6/1995 | Duault et al. |
| 5,432,705 A | 7/1995 | Severt et al. |
| 5,432,711 A | 7/1995 | Jackson et al. |
| 5,434,952 A | 7/1995 | Yen et al. |
| 5,434,997 A | 7/1995 | Landry et al. |
| 5,437,007 A | 7/1995 | Bailey et al. |
| 5,440,237 A | 8/1995 | Brown et al. |
| 5,442,639 A | 8/1995 | Crowder et al. |
| 5,442,791 A | 8/1995 | Wrabetz et al. |
| 5,444,851 A | 8/1995 | Woest |
| 5,444,861 A | 8/1995 | Adamec et al. |
| 5,450,403 A | 9/1995 | Ichii et al. |
| 5,450,425 A | 9/1995 | Gunn et al. |
| 5,450,764 A | 9/1995 | Johnston |
| 5,451,923 A | 9/1995 | Seberger et al. |
| 5,451,939 A | 9/1995 | Price |
| 5,452,201 A | 9/1995 | Pieronek et al. |
| 5,453,933 A | 9/1995 | Wright et al. |
| 5,457,797 A | 10/1995 | Butterworth et al. |
| 5,459,825 A | 10/1995 | Anderson et al. |
| 5,459,839 A | 10/1995 | Swarts et al. |
| 5,461,611 A | 10/1995 | Drake, Jr. et al. |
| 5,461,710 A | 10/1995 | Bloomfield et al. |
| 5,463,735 A | 10/1995 | Pascucci et al. |
| 5,467,264 A | 11/1995 | Rauch et al. |
| 5,469,150 A | 11/1995 | Sitte |
| 5,469,570 A | 11/1995 | Shibata |
| 5,475,856 A | 12/1995 | Kogge |
| 5,481,715 A | 1/1996 | Hamilton et al. |
| 5,481,718 A | 1/1996 | Ryu et al. |
| 5,481,741 A | 1/1996 | McKaskle et al. |
| 5,483,660 A | 1/1996 | Yishay et al. |
| 5,485,617 A | 1/1996 | Stutz et al. |
| 5,485,620 A | 1/1996 | Sadre et al. |
| 5,490,276 A | 2/1996 | Doli, Jr. et al. |
| 5,491,625 A | 2/1996 | Pressnall et al. |
| 5,491,791 A | 2/1996 | Glowny et al. |
| 5,493,534 A | 2/1996 | Mok |
| 5,499,023 A | 3/1996 | Goldschmidt |
| 5,499,365 A | 3/1996 | Anderson et al. |
| 5,499,371 A | 3/1996 | Henninger et al. |
| 5,500,934 A | 3/1996 | Austin et al. |
| 5,501,608 A | 3/1996 | Scheer et al. |
| 5,504,672 A | 4/1996 | Hardiman et al. |
| 5,504,895 A | 4/1996 | Kurosawa et al. |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,645 A | 5/1996 | Stutz et al. |
| 5,517,655 A | 5/1996 | Collins et al. |
| 5,519,605 A | 5/1996 | Cawlfield |
| 5,519,701 A | 5/1996 | Colmant et al. |
| 5,522,044 A | 5/1996 | Pascucci et al. |
| 5,526,287 A | 6/1996 | French |
| 5,526,353 A | 6/1996 | Henley et al. |
| 5,530,377 A | 6/1996 | Walls |
| 5,530,643 A | 6/1996 | Hodorowski |
| 5,530,868 A | 6/1996 | Record et al. |
| 5,531,328 A | 7/1996 | Rochelo et al. |
| 5,534,912 A | 7/1996 | Kostreski |
| 5,535,425 A | 7/1996 | Watanabe |
| 5,537,548 A | 7/1996 | Fin et al. |
| 5,539,638 A | 7/1996 | Keeler et al. |
| 5,539,909 A | 7/1996 | Tanaka et al. |
| 5,541,810 A | 7/1996 | Donhauser et al. |
| 5,542,039 A | 7/1996 | Brinson et al. |
| 5,544,008 A | 8/1996 | Dimmick et al. |
| 5,544,073 A | 8/1996 | Piety et al. |
| 5,544,321 A | 8/1996 | Theimer et al. |
| 5,548,528 A | 8/1996 | Keeler et al. |
| 5,549,137 A | 8/1996 | Lenz et al. |
| 5,550,980 A | 8/1996 | Pascucci et al. |
| 5,551,047 A | 8/1996 | Mori et al. |
| 5,555,213 A | 9/1996 | DeLong |
| 5,555,416 A | 9/1996 | Owens et al. |
| 5,555,437 A | 9/1996 | Packer |
| 5,555,510 A | 9/1996 | Verseput et al. |
| 5,557,559 A | 9/1996 | Rhodes |
| 5,559,691 A | 9/1996 | Monta et al. |
| 5,559,963 A | 9/1996 | Gregg et al. |
| 5,561,770 A | 10/1996 | de Bruijn et al. |
| 5,563,400 A | 10/1996 | Le Roux |
| 5,564,055 A | 10/1996 | Asnaashari et al. |
| 5,566,320 A | 10/1996 | Hubert |
| 5,568,378 A | 10/1996 | Wojsznis |
| 5,570,300 A | 10/1996 | Henry et al. |
| 5,572,643 A | 11/1996 | Judson |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,066 A | 12/1996 | White et al. |
| 5,586,112 A | 12/1996 | Tabata |
| 5,586,156 A | 12/1996 | Gaubatz |
| 5,586,329 A | 12/1996 | Knudsen et al. |
| 5,586,330 A | 12/1996 | Knudsen et al. |
| 5,587,899 A | 12/1996 | Ho et al. |
| 5,594,858 A | 1/1997 | Blevins |
| 5,594,899 A | 1/1997 | Knudsen et al. |
| 5,596,331 A | 1/1997 | Bonaffini et al. |
| 5,596,752 A | 1/1997 | Knudsen et al. |
| 5,598,536 A | 1/1997 | Slaughter, III et al. |
| 5,598,566 A | 1/1997 | Pascucci et al. |
| 5,600,845 A | 2/1997 | Gilson |
| 5,602,749 A | 2/1997 | Vosburgh |
| 5,604,737 A | 2/1997 | Iwami et al. |
| 5,604,871 A | 2/1997 | Pecone |
| 5,608,607 A | 3/1997 | Dittmer |
| 5,608,608 A | 3/1997 | Flint et al. |
| 5,611,057 A | 3/1997 | Pecone et al. |
| 5,613,148 A | 3/1997 | Bezviner et al. |
| 5,613,164 A | 3/1997 | DiAngelo et al. |
| 5,613,190 A | 3/1997 | Hylton |
| 5,617,540 A | 4/1997 | Civanlar et al. |
| 5,621,871 A | 4/1997 | Jaremko et al. |
| 5,621,890 A | 4/1997 | Notarianni et al. |
| 5,623,592 A | 4/1997 | Carlson et al. |
| 5,623,670 A | 4/1997 | Bohannon et al. |
| 5,627,979 A | 5/1997 | Chang et al. |
| 5,629,872 A | 5/1997 | Gross et al. |
| 5,629,949 A | 5/1997 | Zook |

(56) References Cited

U.S. PATENT DOCUMENTS

| | | |
|---|---|---|
| 5,630,056 A | 5/1997 | Horvath et al. |
| 5,630,152 A | 5/1997 | DeLuca et al. |
| 5,633,811 A | 5/1997 | Canada et al. |
| 5,642,259 A | 6/1997 | Ma |
| 5,642,511 A | 6/1997 | Chow et al. |
| 5,648,768 A | 7/1997 | Bouve |
| 5,649,121 A | 7/1997 | Budman et al. |
| 5,655,092 A | 8/1997 | Ojala |
| 5,659,680 A | 8/1997 | Cunningham et al. |
| 5,659,727 A | 8/1997 | Velissaropoulos et al. |
| 5,664,101 A | 9/1997 | Picache |
| 5,664,168 A | 9/1997 | Yishay et al. |
| 5,671,374 A | 9/1997 | Postman et al. |
| 5,671,436 A | 9/1997 | Morris et al. |
| 5,673,401 A | 9/1997 | Volk et al. |
| 5,676,141 A | 10/1997 | Hollub |
| 5,680,404 A | 10/1997 | Gray |
| 5,680,409 A | 10/1997 | Qin et al. |
| 5,682,317 A | 10/1997 | Keeler et al. |
| 5,682,476 A | 10/1997 | Tapperson et al. |
| 5,687,316 A | 11/1997 | Graziano et al. |
| 5,691,897 A | 11/1997 | Brown et al. |
| 5,700,090 A | 12/1997 | Eryurek |
| 5,701,414 A | 12/1997 | Cheng et al. |
| 5,701,484 A | 12/1997 | Artsy |
| 5,704,011 A | 12/1997 | Hansen et al. |
| 5,706,502 A | 1/1998 | Foley et al. |
| 5,708,709 A | 1/1998 | Rose |
| 5,708,779 A | 1/1998 | Graziano et al. |
| 5,713,045 A | 1/1998 | Berdahl |
| 5,715,178 A | 2/1998 | Scarola et al. |
| 5,716,221 A | 2/1998 | Kantner |
| 5,717,880 A | 2/1998 | Imai et al. |
| 5,717,925 A | 2/1998 | Harper et al. |
| 5,719,761 A | 2/1998 | Gatti et al. |
| 5,724,025 A | 3/1998 | Tavori |
| 5,726,911 A | 3/1998 | Canada et al. |
| 5,726,912 A | 3/1998 | Krall, Jr. et al. |
| 5,727,128 A | 3/1998 | Morrison |
| 5,732,074 A | 3/1998 | Spaur et al. |
| 5,732,218 A | 3/1998 | Bland et al. |
| 5,734,902 A | 3/1998 | Atkins et al. |
| 5,737,529 A | 4/1998 | Dolin, Jr. et al. |
| 5,740,429 A | 4/1998 | Wang et al. |
| 5,740,441 A | 4/1998 | Yellin et al. |
| 5,742,596 A | 4/1998 | Baratz et al. |
| 5,742,762 A | 4/1998 | Scholl et al. |
| 5,745,049 A | 4/1998 | Akiyama et al. |
| 5,746,511 A | 5/1998 | Eryurek et al. |
| 5,748,467 A | 5/1998 | Qin et al. |
| 5,748,896 A | 5/1998 | Daly et al. |
| 5,748,912 A | 5/1998 | Lee |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,189 A | 5/1998 | Doi et al. |
| 5,754,772 A | 5/1998 | Leaf |
| 5,754,830 A | 5/1998 | Butts et al. |
| 5,757,925 A | 5/1998 | Faybishenko |
| 5,758,073 A | 5/1998 | Liang et al. |
| 5,758,075 A | 5/1998 | Graziano et al. |
| 5,761,033 A | 6/1998 | Wilhelm |
| 5,761,090 A | 6/1998 | Gross et al. |
| 5,761,405 A | 6/1998 | Tadamura et al. |
| 5,761,421 A | 6/1998 | van Hoff et al. |
| 5,761,477 A | 6/1998 | Wahbe et al. |
| 5,761,499 A | 6/1998 | Sonderegger |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,378 A | 6/1998 | Yang |
| 5,774,670 A | 6/1998 | Montulli |
| 5,777,874 A | 7/1998 | Flood et al. |
| 5,778,368 A | 7/1998 | Hogan et al. |
| 5,784,557 A | 7/1998 | Oprescu |
| 5,786,119 A | 7/1998 | Sorriero et al. |
| 5,787,247 A | 7/1998 | Norin et al. |
| 5,787,272 A | 7/1998 | Gupta et al. |
| 5,787,280 A | 7/1998 | Joseph et al. |
| 5,790,791 A | 8/1998 | Chong et al. |
| 5,793,963 A | 8/1998 | Tapperson et al. |
| 5,794,071 A | 8/1998 | Watanabe et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,802,389 A | 9/1998 | McNutt |
| 5,805,153 A | 9/1998 | Nielsen |
| 5,805,442 A | 9/1998 | Crater et al. |
| 5,805,889 A | 9/1998 | Van De Vanter |
| 5,805,922 A | 9/1998 | Sim et al. |
| 5,809,247 A | 9/1998 | Richardson et al. |
| 5,812,394 A | 9/1998 | Lewis et al. |
| 5,815,152 A | 9/1998 | Collier et al. |
| 5,815,659 A | 9/1998 | Umetsu et al. |
| 5,815,710 A | 9/1998 | Martin et al. |
| 5,822,220 A | 10/1998 | Baines |
| 5,828,567 A | 10/1998 | Eryurek et al. |
| 5,828,851 A | 10/1998 | Nixon et al. |
| 5,828,882 A | 10/1998 | Hinckley |
| 5,831,669 A | 11/1998 | Adrain |
| 5,832,268 A | 11/1998 | Anderson et al. |
| 5,832,418 A | 11/1998 | Meyer |
| 5,835,704 A | 11/1998 | Li et al. |
| 5,835,712 A | 11/1998 | DuFresne |
| 5,835,724 A | 11/1998 | Smith |
| 5,835,789 A | 11/1998 | Ueda et al. |
| 5,838,563 A | 11/1998 | Dove et al. |
| 5,838,910 A | 11/1998 | Domenikos et al. |
| 5,838,920 A | 11/1998 | Rosborough |
| 5,838,969 A | 11/1998 | Jacklin et al. |
| 5,839,094 A | 11/1998 | French |
| 5,841,360 A | 11/1998 | Binder |
| 5,841,654 A | 11/1998 | Verissimo et al. |
| 5,841,963 A | 11/1998 | Nakamikawa et al. |
| 5,841,991 A | 11/1998 | Russell |
| 5,844,601 A | 12/1998 | McPheely et al. |
| 5,844,796 A | 12/1998 | Araki |
| 5,844,804 A | 12/1998 | Schussler |
| 5,845,078 A | 12/1998 | Tezuka et al. |
| 5,845,230 A | 12/1998 | Lamberson |
| 5,847,957 A | 12/1998 | Cohen et al. |
| 5,848,274 A | 12/1998 | Hamby et al. |
| 5,848,393 A | 12/1998 | Goodridge et al. |
| 5,854,750 A | 12/1998 | Phillips et al. |
| 5,854,944 A | 12/1998 | Catherwood et al. |
| 5,859,966 A | 1/1999 | Hayman et al. |
| 5,862,052 A | 1/1999 | Nixon et al. |
| 5,864,773 A | 1/1999 | Barna et al. |
| 5,867,704 A | 2/1999 | Tanaka et al. |
| 5,872,973 A | 2/1999 | Mitchell et al. |
| 5,872,992 A | 2/1999 | Tietjen et al. |
| 5,873,089 A | 2/1999 | Regache |
| 5,874,990 A | 2/1999 | Kato |
| 5,875,430 A | 2/1999 | Koether |
| 5,876,122 A | 3/1999 | Eryurek |
| 5,878,415 A | 3/1999 | Olds |
| 5,880,775 A | 3/1999 | Ross |
| 5,884,014 A | 3/1999 | Huttenlocher et al. |
| 5,903,455 A | 5/1999 | Sharpe, Jr. et al. |
| 5,903,894 A | 5/1999 | Reneris |
| 5,905,248 A | 5/1999 | Russell et al. |
| 5,905,963 A | 5/1999 | Lysejko |
| 5,907,675 A | 5/1999 | Aahlad |
| 5,909,586 A | 6/1999 | Anderson |
| 5,917,822 A | 6/1999 | Lyles et al. |
| 5,917,840 A | 6/1999 | Cheney et al. |
| 5,919,247 A | 7/1999 | Van Hoff et al. |
| 5,920,479 A | 7/1999 | Sojoodi et al. |
| 5,922,050 A | 7/1999 | Madany |
| 5,927,398 A | 7/1999 | Maciulewicz |
| 5,928,345 A | 7/1999 | Tetzlaff et al. |

(56) References Cited

U.S. PATENT DOCUMENTS

| | | |
|---|---|---|
| 5,930,768 A | 7/1999 | Hooban |
| 5,935,242 A | 8/1999 | Madany et al. |
| 5,935,249 A | 8/1999 | Stern et al. |
| 5,940,294 A | 8/1999 | Dove |
| 5,940,839 A | 8/1999 | Chen et al. |
| 5,946,487 A | 8/1999 | Dangelo |
| 5,950,006 A | 9/1999 | Crater et al. |
| 5,950,172 A | 9/1999 | Klingman |
| 5,956,484 A | 9/1999 | Rosenberg et al. |
| 5,956,487 A | 9/1999 | Venkatraman et al. |
| 5,956,716 A | 9/1999 | Kenner et al. |
| 5,959,487 A | 9/1999 | Kawamura |
| 5,960,205 A | 9/1999 | Mao et al. |
| 5,960,214 A | 9/1999 | Sharpe, Jr. et al. |
| 5,966,304 A | 10/1999 | Cook et al. |
| 5,969,967 A | 10/1999 | Aahlad et al. |
| 5,970,430 A | 10/1999 | Burns et al. |
| 5,974,497 A | 10/1999 | Teshome |
| 5,975,737 A | 11/1999 | Crater et al. |
| 5,978,578 A | 11/1999 | Azarya et al. |
| 5,978,933 A | 11/1999 | Wyld et al. |
| 5,980,078 A | 11/1999 | Krivoshein et al. |
| 5,980,090 A | 11/1999 | Royal, Jr. et al. |
| 5,982,362 A | 11/1999 | Crater et al. |
| 5,982,762 A | 11/1999 | Anzai et al. |
| 5,987,506 A | 11/1999 | Carter |
| 5,988,852 A | 11/1999 | Nakanishi |
| 5,994,998 A | 11/1999 | Fisher et al. |
| 5,995,916 A | 11/1999 | Nixon et al. |
| 6,002,104 A | 12/1999 | Hsu |
| 6,006,164 A | 12/1999 | McCarty et al. |
| 6,006,171 A | 12/1999 | Vines et al. |
| 6,008,985 A | 12/1999 | Lake et al. |
| 6,009,103 A | 12/1999 | Woundy |
| 6,014,591 A | 1/2000 | Ikeda |
| 6,014,612 A | 1/2000 | Larson et al. |
| 6,016,515 A | 1/2000 | Shaw et al. |
| 6,018,627 A | 1/2000 | Iyengar et al. |
| 6,018,816 A | 1/2000 | Tateyama |
| 6,026,336 A | 2/2000 | Sakurai et al. |
| 6,026,352 A | 2/2000 | Burns et al. |
| 6,032,151 A | 2/2000 | Arnold et al. |
| 6,032,208 A | 2/2000 | Nixon et al. |
| H1845 H | 3/2000 | Kelly |
| 6,033,257 A | 3/2000 | Lake et al. |
| 6,035,264 A | 3/2000 | Donaldson et al. |
| 6,038,271 A | 3/2000 | Olaker et al. |
| 6,038,486 A | 3/2000 | Saitoh et al. |
| 6,044,305 A | 3/2000 | Larson et al. |
| 6,047,222 A | 4/2000 | Burns et al. |
| 6,049,578 A | 4/2000 | Senechal et al. |
| 6,049,775 A | 4/2000 | Gertner et al. |
| 6,052,629 A | 4/2000 | Leatherman et al. |
| 6,055,633 A | 4/2000 | Schrier et al. |
| 6,061,603 A | 5/2000 | Papadopoulos et al. |
| 6,070,186 A | 5/2000 | Nishio |
| 6,070,250 A | 5/2000 | Yeager et al. |
| 6,073,109 A | 6/2000 | Flores et al. |
| 6,075,863 A | 6/2000 | Krishnan et al. |
| 6,076,124 A | 6/2000 | Korowitz et al. |
| 6,078,320 A | 6/2000 | Dove et al. |
| 6,078,848 A | 6/2000 | Bernstein et al. |
| 6,080,207 A | 6/2000 | Kroening et al. |
| 6,085,120 A | 7/2000 | Schwerdtfeger et al. |
| 6,088,665 A | 7/2000 | Burns et al. |
| 6,094,600 A | 7/2000 | Sharpe, Jr. et al. |
| 6,094,655 A | 7/2000 | Rogers et al. |
| 6,094,684 A | 7/2000 | Pallmann |
| 6,095,674 A | 8/2000 | Verissimo et al. |
| 6,097,761 A | 8/2000 | Buhring et al. |
| 6,098,116 A | 8/2000 | Nixon et al. |
| 6,104,391 A | 8/2000 | Johnston, Jr. et al. |
| 6,104,875 A | 8/2000 | Gallagher et al. |
| 6,105,132 A | 8/2000 | Fritch et al. |
| 6,108,662 A | 8/2000 | Hoskins et al. |
| 6,112,020 A | 8/2000 | Wright |
| 6,112,246 A | 8/2000 | Horbal et al. |
| 6,115,468 A | 9/2000 | De Nicolo |
| 6,115,744 A | 9/2000 | Robins et al. |
| 6,129,449 A | 10/2000 | McCain et al. |
| 6,129,724 A | 10/2000 | Fleischman et al. |
| 6,131,067 A | 10/2000 | Girerd et al. |
| 6,133,914 A | 10/2000 | Rogers et al. |
| 6,134,559 A | 10/2000 | Brumme et al. |
| 6,138,140 A | 10/2000 | Yokote |
| 6,138,174 A | 10/2000 | Keeley |
| 6,139,177 A | 10/2000 | Venkatraman et al. |
| 6,140,911 A | 10/2000 | Fisher et al. |
| 6,141,794 A | 10/2000 | Dice et al. |
| 6,148,346 A | 11/2000 | Hanson |
| 6,148,391 A | 11/2000 | Petrick |
| 6,151,625 A | 11/2000 | Swales et al. |
| 6,154,875 A | 11/2000 | Tanaka et al. |
| 6,157,864 A | 12/2000 | Schwenke et al. |
| 6,160,484 A | 12/2000 | Spahl et al. |
| 6,167,253 A | 12/2000 | Farris et al. |
| 6,167,464 A | 12/2000 | Kretschmann |
| 6,170,007 B1 | 1/2001 | Venkatraman et al. |
| 6,173,414 B1 | 1/2001 | Zumkehr et al. |
| 6,175,556 B1 | 1/2001 | Allen, Jr. et al. |
| 6,176,421 B1 | 1/2001 | Royal, Jr. et al. |
| 6,183,289 B1 | 2/2001 | Lake et al. |
| 6,185,611 B1 | 2/2001 | Waldo et al. |
| 6,192,281 B1 | 2/2001 | Brown et al. |
| 6,195,591 B1 | 2/2001 | Nixon et al. |
| 6,195,694 B1 | 2/2001 | Chen et al. |
| 6,195,774 B1 | 2/2001 | Jacobson |
| 6,199,068 B1 | 3/2001 | Carpenter |
| 6,199,195 B1 | 3/2001 | Goodwin et al. |
| 6,201,996 B1 | 3/2001 | Crater et al. |
| 6,212,440 B1 | 4/2001 | Suzuki |
| 6,212,575 B1 | 4/2001 | Cleron et al. |
| 6,212,608 B1 | 4/2001 | Bak |
| 6,216,158 B1 | 4/2001 | Luo et al. |
| 6,218,930 B1 | 4/2001 | Katzenberg et al. |
| 6,219,708 B1 | 4/2001 | Martenson |
| 6,226,783 B1 | 5/2001 | Limondin et al. |
| 6,236,909 B1 | 5/2001 | Colson et al. |
| 6,246,748 B1 | 6/2001 | Yano |
| 6,260,187 B1 | 7/2001 | Cirne |
| 6,263,487 B1 | 7/2001 | Stripf et al. |
| 6,266,716 B1 | 7/2001 | Wilson et al. |
| 6,266,724 B1 | 7/2001 | Harari et al. |
| 6,268,789 B1 | 7/2001 | Diamant et al. |
| 6,269,473 B1 | 7/2001 | Freed et al. |
| 6,272,529 B1 | 8/2001 | Lum |
| 6,272,556 B1 | 8/2001 | Gish |
| 6,282,454 B1 | 8/2001 | Papadopoulos et al. |
| 6,282,455 B1 * | 8/2001 | Engdahl ..................... 700/83 |
| 6,285,966 B1 | 9/2001 | Brown et al. |
| 6,289,299 B1 * | 9/2001 | Daniel et al. ............... 703/21 |
| 6,295,356 B1 | 9/2001 | De Nicolo |
| 6,295,513 B1 | 9/2001 | Thackston |
| 6,298,377 B1 | 10/2001 | Hartikainen et al. |
| 6,308,317 B1 | 10/2001 | Wilkinson et al. |
| 6,311,101 B1 | 10/2001 | Kastner |
| 6,314,448 B1 | 11/2001 | Conner et al. |
| 6,314,464 B1 | 11/2001 | Murata et al. |
| 6,317,701 B1 | 11/2001 | Pyotsia et al. |
| 6,324,607 B1 | 11/2001 | Korowitz et al. |
| 6,327,511 B1 | 12/2001 | Naismith et al. |
| 6,332,163 B1 | 12/2001 | Bowman-Amuah |
| 6,334,161 B1 | 12/2001 | Suzuki et al. |
| 6,336,142 B1 | 1/2002 | Kato et al. |
| 6,345,295 B1 | 2/2002 | Beardsley et al. |
| 6,345,382 B1 | 2/2002 | Hughes |
| 6,348,874 B1 | 2/2002 | Cole et al. |
| 6,349,274 B1 | 2/2002 | Kay et al. |
| 6,349,287 B1 | 2/2002 | Hayashi |
| 6,353,859 B1 | 3/2002 | McKeehan et al. |
| 6,353,860 B1 | 3/2002 | Hare et al. |
| 6,360,091 B1 | 3/2002 | Schellinger et al. |
| 6,366,300 B1 | 4/2002 | Ohara et al. |
| 6,370,448 B1 | 4/2002 | Eryurek |

(56) References Cited

U.S. PATENT DOCUMENTS

| | | | |
|---|---|---|---|
| 6,370,573 B1 | 4/2002 | Bowman-Amuah |
| 6,373,841 B1 | 4/2002 | Goh et al. |
| 6,377,543 B1 | 4/2002 | Grover et al. |
| 6,377,859 B1 | 4/2002 | Brown et al. |
| 6,382,226 B1 | 5/2002 | Larson et al. |
| 6,393,050 B1 | 5/2002 | Liu |
| 6,405,099 B1 | 6/2002 | Nagai et al. |
| 6,405,210 B1 | 6/2002 | Doyle et al. |
| 6,412,070 B1 | 6/2002 | Van Dyke et al. |
| 6,418,499 B1 | 7/2002 | Korowitz et al. |
| 6,424,883 B1 | 7/2002 | Hosokawa et al. |
| 6,429,885 B1 | 8/2002 | Saib et al. |
| 6,430,564 B1 | 8/2002 | Judge et al. |
| 6,434,594 B1 | 8/2002 | Wesemann |
| 6,438,182 B1 | 8/2002 | Olaker et al. |
| 6,442,442 B1 | 8/2002 | Weinhofer |
| 6,445,962 B1 | 9/2002 | Blevins et al. |
| 6,449,624 B1 | 9/2002 | Hammack et al. |
| 6,449,715 B1 | 9/2002 | Krivoshein |
| 6,480,903 B1 | 11/2002 | Voutaz et al. |
| 6,480,955 B1 | 11/2002 | DeKoning et al. |
| 6,487,214 B1 | 11/2002 | Bachar |
| 6,487,558 B1 | 11/2002 | Hitchcock |
| 6,493,405 B1 | 12/2002 | Olaker et al. |
| 6,496,892 B1 | 12/2002 | Lake et al. |
| 6,499,048 B1 | 12/2002 | Williams |
| 6,501,995 B1 | 12/2002 | Kinney et al. |
| 6,510,352 B1 | 1/2003 | Badavas et al. |
| 6,515,688 B1 * | 2/2003 | Berry et al. ............ 715/848 |
| 6,526,455 B1 | 2/2003 | Kamimura |
| 6,526,516 B1 | 2/2003 | Ishikawa et al. |
| 6,532,531 B1 | 3/2003 | O'Connor et al. |
| 6,557,056 B1 | 4/2003 | Lanteigne et al. |
| 6,563,420 B2 | 5/2003 | Brown et al. |
| 6,574,515 B1 | 6/2003 | Kirkpatrick et al. |
| 6,574,694 B1 | 6/2003 | Chen et al. |
| 6,594,692 B1 | 7/2003 | Reisman |
| 6,598,224 B1 | 7/2003 | Maeda et al. |
| 6,609,147 B1 | 8/2003 | Matsuda et al. |
| 6,612,022 B1 | 9/2003 | Gale et al. |
| 6,618,754 B1 | 9/2003 | Gosling |
| 6,622,147 B1 | 9/2003 | Smiga et al. |
| 6,636,900 B2 | 10/2003 | Abdelnur |
| 6,640,308 B1 | 10/2003 | Keyghobad et al. |
| 6,647,495 B1 | 11/2003 | Takeuchi et al. |
| 6,654,353 B1 | 11/2003 | Tokura et al. |
| 6,671,763 B1 | 12/2003 | Korowitz et al. |
| 6,675,193 B1 | 1/2004 | Slavin et al. |
| 6,687,698 B1 | 2/2004 | Nixon et al. |
| 6,700,869 B1 | 3/2004 | Falco et al. |
| 6,701,284 B1 | 3/2004 | Huntley et al. |
| 6,718,215 B2 | 4/2004 | Friedrich et al. |
| 6,718,533 B1 | 4/2004 | Schneider et al. |
| 6,734,884 B1 * | 5/2004 | Berry et al. ............ 715/848 |
| 6,738,388 B1 | 5/2004 | Stevenson et al. |
| 6,754,885 B1 | 6/2004 | Dardinski et al. |
| 6,760,687 B2 | 7/2004 | Apel et al. |
| 6,763,370 B1 | 7/2004 | Schmeidler et al. |
| 6,772,017 B1 | 8/2004 | Dove et al. |
| 6,775,707 B1 | 8/2004 | Bennett et al. |
| 6,788,980 B1 | 9/2004 | Johnson |
| 6,789,054 B1 | 9/2004 | Makhlouf |
| 6,792,321 B2 | 9/2004 | Sepe, Jr. |
| 6,799,148 B2 | 9/2004 | Ling et al. |
| 6,799,185 B2 | 9/2004 | Wallman et al. |
| 6,799,195 B1 | 9/2004 | Thibault et al. |
| 6,806,847 B2 | 10/2004 | Nixon et al. |
| 6,807,558 B1 | 10/2004 | Hassett et al. |
| 6,826,590 B1 | 11/2004 | Glanzer et al. |
| 6,832,223 B1 | 12/2004 | Scheifler et al. |
| 6,850,973 B1 | 2/2005 | Larson et al. |
| 6,853,867 B1 | 2/2005 | Klindt et al. |
| 6,868,538 B1 | 3/2005 | Nixon et al. |
| 6,874,082 B2 | 3/2005 | Tateyama et al. |
| 6,888,541 B2 | 5/2005 | Morse |
| 6,895,409 B2 | 5/2005 | Uluakar et al. |
| 6,928,396 B2 | 8/2005 | Thackston |
| 6,959,356 B2 | 10/2005 | Packwood et al. |
| 6,978,194 B2 | 12/2005 | McIlhany et al. |
| 6,983,227 B1 | 1/2006 | Thalhammer-Reyero |
| 7,020,532 B2 | 3/2006 | Johnson et al. |
| 7,024,282 B2 | 4/2006 | Coogan et al. |
| 7,032,045 B2 | 4/2006 | Kostadinov |
| 7,054,793 B2 | 5/2006 | Moritz et al. |
| 7,080,366 B2 | 7/2006 | Kramskoy et al. |
| 7,086,009 B2 | 8/2006 | Resnick et al. |
| 7,089,530 B1 | 8/2006 | Dardinski et al. |
| 7,096,465 B1 | 8/2006 | Dardinski et al. |
| 7,110,835 B2 | 9/2006 | Blevins et al. |
| 7,123,974 B1 | 10/2006 | Hamilton |
| 7,130,704 B2 | 10/2006 | McKelvey |
| 7,142,322 B2 | 11/2006 | Lee |
| 7,146,231 B2 | 12/2006 | Schleiss et al. |
| 7,146,408 B1 | 12/2006 | Crater et al. |
| 7,151,966 B1 | 12/2006 | Baier et al. |
| 7,158,513 B2 | 1/2007 | Wada et al. |
| 7,162,510 B2 | 1/2007 | Jammes |
| 7,177,052 B2 | 2/2007 | Lapstun et al. |
| 7,199,784 B2 | 4/2007 | Mathiowetz et al. |
| 7,245,271 B2 | 7/2007 | Nixon et al. |
| 7,249,330 B2 | 7/2007 | Roesner et al. |
| 7,272,815 B1 | 9/2007 | Eldridge et al. |
| 7,275,062 B2 | 9/2007 | Deitz et al. |
| 7,337,256 B2 | 2/2008 | Korowitz et al. |
| 7,356,588 B2 | 4/2008 | Stineman, Jr. et al. |
| 7,502,656 B2 | 3/2009 | Thibault et al. |
| 7,574,693 B1 | 8/2009 | Kemink |
| 7,610,354 B2 | 10/2009 | Adams et al. |
| 7,664,574 B2 | 2/2010 | Imhof et al. |
| 7,676,356 B2 | 3/2010 | Carmel et al. |
| 7,720,944 B2 | 5/2010 | Thibault et al. |
| 7,739,361 B2 | 6/2010 | Thibault et al. |
| 7,817,150 B2 | 10/2010 | Reichard et al. |
| 7,882,197 B2 | 2/2011 | Thibault et al. |
| 7,890,927 B2 | 2/2011 | Eldridge et al. |
| 7,899,070 B2 | 3/2011 | Thibault et al. |
| 7,949,295 B2 * | 5/2011 | Kumar et al. ............ 434/307 R |
| 2001/0007133 A1 | 7/2001 | Moriconi et al. |
| 2001/0007183 A1 | 7/2001 | Weder |
| 2001/0025307 A1 | 9/2001 | Venkatraman et al. |
| 2001/0034777 A1 | 10/2001 | Venkatraman et al. |
| 2001/0034778 A1 | 10/2001 | Venkatraman et al. |
| 2001/0034779 A1 | 10/2001 | Venkatraman et al. |
| 2001/0034780 A1 | 10/2001 | Venkatraman et al. |
| 2001/0034781 A1 | 10/2001 | Venkatraman et al. |
| 2001/0037489 A1 | 11/2001 | Stripf et al. |
| 2001/0044836 A1 | 11/2001 | Venkatraman et al. |
| 2001/0052109 A1 | 12/2001 | Nagashima et al. |
| 2002/0013629 A1 | 1/2002 | Nixon et al. |
| 2002/0049865 A1 | 4/2002 | Charnell et al. |
| 2002/0093980 A1 | 7/2002 | Trebes |
| 2002/0133636 A1 | 9/2002 | Venkatraman et al. |
| 2002/0150156 A1 | 10/2002 | Calvin |
| 2002/0165848 A1 | 11/2002 | Rautenbach et al. |
| 2002/0194393 A1 | 12/2002 | Hrischuk et al. |
| 2002/0198920 A1 | 12/2002 | Resnick et al. |
| 2003/0009250 A1 | 1/2003 | Resnick et al. |
| 2003/0051068 A1 | 3/2003 | Eldridge |
| 2003/0115238 A1 | 6/2003 | O'Connor et al. |
| 2003/0167269 A1 | 9/2003 | Gupta |
| 2003/0200351 A1 | 10/2003 | O'Connor et al. |
| 2003/0200369 A1 | 10/2003 | Musumeci |
| 2003/0208558 A1 | 11/2003 | Venkatraman et al. |
| 2004/0103165 A1 | 5/2004 | Nixon et al. |
| 2004/0117534 A1 | 6/2004 | Parry et al. |
| 2004/0221289 A1 | 11/2004 | D'Souza et al. |
| 2005/0138226 A1 | 6/2005 | Tateyama et al. |
| 2005/0149893 A1 | 7/2005 | Roesner et al. |
| 2005/0160263 A1 | 7/2005 | Naizhen et al. |
| 2005/0172258 A1 | 8/2005 | Nixon et al. |
| 2005/0283730 A1 * | 12/2005 | Uyttendaele et al. ......... 715/720 |
| 2006/0129724 A1 | 6/2006 | Kostadinov |
| 2006/0206860 A1 | 9/2006 | Dardinski et al. |
| 2006/0206866 A1 | 9/2006 | Eldrige et al. |

(56) References Cited

U.S. PATENT DOCUMENTS

| | | | |
|---|---|---|---|
| 2006/0212146 | A1 | 9/2006 | Johnson et al. |
| 2007/0006149 | A1 | 1/2007 | Resnick et al. |
| 2007/0019560 | A1 | 1/2007 | Brewer et al. |
| 2007/0061786 | A1 | 3/2007 | Zhou et al. |
| 2007/0083552 | A1 | 4/2007 | Allen et al. |
| 2007/0110835 | A1 | 5/2007 | Maes et al. |
| 2007/0118805 | A1* | 5/2007 | Kraus et al. ............... 715/757 |
| 2007/0244571 | A1 | 10/2007 | Wilson et al. |
| 2007/0265089 | A1* | 11/2007 | Robarts et al. ............... 463/42 |
| 2008/0040477 | A1 | 2/2008 | Johnson et al. |
| 2008/0046598 | A1 | 2/2008 | Johnson et al. |
| 2008/0052386 | A1 | 2/2008 | Johnson et al. |
| 2008/0119951 | A1 | 5/2008 | Thibault et al. |
| 2008/0120367 | A1 | 5/2008 | Thibault et al. |
| 2008/0126500 | A1 | 5/2008 | Thibault et al. |
| 2008/0133700 | A1 | 6/2008 | Thibault et al. |
| 2008/0134215 | A1 | 6/2008 | Thibault et al. |
| 2008/0148170 | A1 | 6/2008 | Thibault et al. |
| 2008/0216169 | A1 | 9/2008 | Naizhen et al. |
| 2008/0222276 | A1 | 9/2008 | Thibault et al. |
| 2009/0094326 | A1 | 4/2009 | Thibault et al. |
| 2009/0118845 | A1 | 5/2009 | Eldridge et al. |
| 2009/0118846 | A1 | 5/2009 | Eldridge et al. |
| 2009/0125128 | A1 | 5/2009 | Eldridge et al. |
| 2009/0125129 | A1 | 5/2009 | Eldridge et al. |
| 2009/0125130 | A1 | 5/2009 | Eldridge et al. |
| 2009/0125131 | A1 | 5/2009 | Eldridge et al. |
| 2009/0132996 | A1 | 5/2009 | Eldridge et al. |
| 2009/0164031 | A1 | 6/2009 | Johnson et al. |
| 2009/0193347 | A1 | 7/2009 | Takahashi et al. |
| 2009/0241086 | A1 | 9/2009 | Saito et al. |
| 2009/0259751 | A1 | 10/2009 | Thibault et al. |
| 2009/0319058 | A1 | 12/2009 | Rovaglio et al. |
| 2010/0005425 | A1 | 1/2010 | Kodosky et al. |
| 2010/0011127 | A1 | 1/2010 | Johnson et al. |
| 2010/0011311 | A1 | 1/2010 | Kodosky et al. |
| 2010/0076604 | A1 | 3/2010 | Johnson et al. |
| 2010/0121999 | A1 | 5/2010 | Isenmann et al. |
| 2010/0131084 | A1 | 5/2010 | Van Camp |
| 2010/0222902 | A1 | 9/2010 | Eldridge et al. |
| 2010/0223593 | A1 | 9/2010 | Eldridge et al. |
| 2010/0305720 | A1 | 12/2010 | Doll et al. |
| 2010/0305721 | A1 | 12/2010 | Kostadinov et al. |
| 2011/0040390 | A1 | 2/2011 | Blevins et al. |
| 2011/0093098 | A1 | 4/2011 | Kostadinov et al. |

FOREIGN PATENT DOCUMENTS

| | | |
|---|---|---|
| EP | 0640905 | 3/1995 |
| EP | 0660231 | 6/1995 |
| EP | 0906595 | 4/1999 |
| EP | 1006691 | 6/2000 |
| JP | 02159526 A | 6/1990 |
| JP | 09033647 A | 2/1997 |
| JP | 10019655 A | 1/1998 |
| JP | 11143511 A | 5/1999 |
| WO | WO-9114324 | 9/1991 |
| WO | WO-9504314 A1 | 2/1995 |
| WO | WO-9623377 A1 | 8/1996 |
| WO | WO-96/31047 A2 | 10/1996 |
| WO | WO-9707486 A1 | 2/1997 |
| WO | WO-9726587 A1 | 7/1997 |
| WO | WO-9820649 A1 | 5/1998 |
| WO | WO-9829804 A1 | 7/1998 |
| WO | WO-9836518 A2 | 8/1998 |
| WO | WO-9854843 A1 | 12/1998 |
| WO | WO-0077592 A2 | 12/2000 |
| WO | WO-03039098 A2 | 5/2003 |
| WO | 2010138412 A1 | 12/2010 |

OTHER PUBLICATIONS

U.S. Appl. No. 11/260,859, filed Oct. 28, 2005, Keyghobad et al.
"1995 World Batch Forum: Meeting of the Minds [Agenda]," (May 22-24, 1995) Newtown Square, Pennsylvania, (2 pages).
"A sensation in supervisory control," Manufacturing Systems (Windows NT in manufacturing Supplement), Oct. 1996, pp. 12A-24A.
"AC I/O Modules Available for Low-Cost Automation Controller," New Release, Control Technology Corporation, Jun. 28, 1989 (DialogWeb search result) (1 page).
"Agenda," ISA/SP50—1988-180, ISA Draft, May 3-5, 1988.
"Agenda," World Batch Forum 1994 (Mar. 6-9, 1994), Tempe, AZ, (9 pages).
"Apacs Control System," Power vol. 139, No. 6 (Jun. 1995) p. 81 (Dialog print-out).
"Application of PRIAM Model to Safety Systems on Offshore Oil/Gas Platforms," Silvertech Ltd., Jan. 9, 1995.
"At Interop, Will ToasterNet Be on the Hot List?" Data Communications, vol. 19, No. 13, Oct. 1990, p. 214.
"Automation Controller accepts Customization," News Release, Control Technology, Jul. 12, 1985, (DialogWeb search result).
"Automation Controller features fast 80186 Processor, Integrated Software," News Release, Control Technology (US), Apr. 22, 1986, (DialogWeb search result).
"Automation Programming Environment runs on IBM (R)-PC," News Release, Control Technology (US), Mar. 29, 1988, (DialogWeb search result).
"Automation System Monitors, Controls Fab HVAC, Other Systems," Microcontamination (Aug. 1994).
"Background Info on Mercury Project," (no date available).
"Breaking News for Invensys Software Systems Employees: iBaan and FactorySuite 2000 Integration Announced," internal e-mail dated Mar. 23, 2001.
"Briefs," Network World, May 29, 1995, p. 19.
"bsy's List of Internet Accessible Coke Machines," web page print-out (Feb. 12, 1999) from http://www-cse.ucsd.edu/users/bsy/coke.html (1 page).
"CAD/CAM Software creates Automation 'Programming Environment'," News Release, Control Technology (US), Oct. 3, 1988, (DialogWeb search result).
"CMU SCS Coke Machine: Current Status," web page print-out (Feb. 12, 1999) from http://www.cs.cmu.edu/.about.coke/ (1 page).
"Compact System Combines Motion Control, Machine Control," News Release, Control Technology, May 28, 1985, (DialogWeb search result).
"Company Profiles: What Users Need," Power vol. 139 No. 6 (Jun. 1995) p. 81.
"Control System Features Plug-and-Play Technology, Scalability," Chemical Processing (May 1996), p. 33.
"Control system," Power vol. 139, No. 4 (Apr. 1995) p. 114 (Dialog print-out).
"ControlShell Version 5.1 User's Manual," Real-Time Innovations, Jun. 1996, whole manual.
"ControlShell Version 6.0 User's Manual," Real-Time Innovations, Jan. 1999, whole manual.
"DeltaV(tm) System: We Do Smart Plants." Brochure issued by Fisher-Rosemount Systems (1998).
"DeltaV.TM. System Overview: Do More." Brochure issued by Fisher-Rosemount Systems (1998).
"Disk Drive with Embedded Hyper-Text Markup Language Server," IBM TDB, vol. 38, n. 12, Dec. 1995, pp. 479-480.
"Dual-Axis Servo Module for Small Controller," News Release, Control Technology (US), Sep. 11, 1990, (DialogWeb search result).
"Editors' Product Picks," Chemical Processing (May 1996), p. 34.
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.
"ErgoTech upgrades ErgoCim; first 'plug and play' component software for manufacturing," Business Wire, Feb. 15, 1996.
"Fisher-Rosemount Is: Managing the Process Better," Fisher Controls International, Inc. and Rosemount Inc. 1993, (19 pages).
"Gensym Announces Its Initiative for Leveraging Intelligent Systems with Internet/Intranet Technology," Business Wire, Oct. 7, 1997.
"Gensym introduces G2 WebMiner for accessing and reasoning about data from the World Wide Web," Business Wire, May 15, 1996.
"Gensym introduces Internet connectivity for its G2 family of intelligent real-time software," Business Wire, Mar. 18, 1996.

(56) References Cited

OTHER PUBLICATIONS

"I/A Series Model 51 FoxRemote II Installation and Configuration Guide," Apr. 8, 1998 (Preliminary), pp. i-iv, 1-2.
"Industries Fashion NASA Products Into Commercial Work", Anne Eisele, Space News, v9, n14, p. 14, Apr. 6, 1998, 1 page.
"Industry's top embedded operating software supports Java; pSOSystem enables Embedded Internet applications and Low-cost Internet appliances," Business Wire, Feb. 1, 1996.
"Inexpensive Automation Controller features Message Display Capability," News Release, Control Technology (US), May 19, 1989, (DialogWeb search result).
"Information technology in manufacturing," Manufacturing Systems, vol. 14, No. 12, Dec. 1996, pp. 54-78.
"Innovative Small Controller Family offers Full Integration," News Release, Control Technology, Aug. 17, 1989, (DialogWeb search result).
"Integrated Systems; Industry's top embedded operating software supports Java," M2 Presswire, Mar. 4, 1996.
"Intel, SunDisk offerings narrow flash focus," Electronic Engineering Times, p. 10, Oct. 24, 1994.
"Internet windows to the world," New Media Age, Oct. 26, 1995, p. 4.
"Introducing Bailey Evolution 90TM. . . . The sound investment strategy for process automation," Bailey 1990 (brochure).
"Jim Henry's 1996 ASEE Paper," web page print-out from http://chem.engr.utc.edu/Documents/ASEE-96-full.html (5 pages).
"Linear Actuators offer Plug-Compatibility with Controller," News Release, Control Technology (US), Nov. 21, 1985, (DialogWeb search result).
"Low-Cost Automation Controller features Motion Control, Communications," News Release, Control Technology (US), Mar. 7, 1988, (DialogWeb search result).
"Make Your Automation Plan a Reality: MAX1000," Leeds & Northrup Technical Overview, (approximately 1990).
"Mitsubishi licenses Sun's Java tool," Electronic Engineering Times (Dec. 11, 1995) p. 29.
"Modular Valve Assemblies Connect to Controller with Ribbon Cable," New Product Release, Control Technology (US), Jan. 8, 1986, (DialogWeb search result).
"Multi-Tasking Controller provides High-level Instructions for Motion Control, Sequencing," News Release, Control Technology Corporation, Aug. 22, 1986, (DialogWeb search result).
"NCR Fieldbus Slave Controller Advance Information," ISA-SP50-1988-161, ISA Draft.
"New at IPC/92! Ethernet link provides Global PLC Registers," News Release, Control Technology (US), Nov. 20, 1992, (DialogWeb search result).
"NEW at IPC/92! High-Capacity Integrated Motion Controller," News Release, Control Technology (US) Nov. 20, 1992, (DialogWeb search result).
"New Equipment/Literature," Control System vol. 139, No. 4 (Apr. 1995), p. 114.
"New Open Architecture Group Works on Control Standards," Control Engineering Online (Aug. 1997).
"New Products Provide Interactive Graphics Over Web Using Netscape Plug-Ins and Java," PR Newswire, May 20, 1996.
"New Small Automation Controller features Precision Analog I/O Modules," News Release, Control Technology (US), May 30, 1989, (DialogWeb search result).
"New State-Logic Microcontroller," News Release, Control Technology Corp., Jun. 1, 1996 (DialogWeb search result).
"New Telemecanique Programmable Controllers Feature Multiple Programming Languages," (Feb. 11, 1985).
"On-Line Vending Machine and Catalog Product Icons," IBM TDB, v. 38, n. 4 (Apr. 1995), pp. 113-116.
"Operator's Console creates 'Friendly' Machines," News Release, Control Technology (US), May 19, 1986, (DialogWeb search result).
"Operator's Console for Automated Machines," News Release, Control Technology, Aug. 15, 1985, (DialogWeb search result).
"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Pipeline: Announced," InfoWorld, May 29, 1995, p. 45.
"Plant Operations Framework," AMR Report (May/Jun. 1995), (6 pages).
"Plug-Compatible Controls and Actuators Speed System Development," News Release, Control Technology (US), Jan. 13, 1986, (DialogWeb search result).
"Policy Manual," 1994 World Batch Forum (Mar. 6-9, 1994), (15 pages).
"Process Manager Specification and Technical Data," UC03-300 Sep. 1991 Honeywell, copyright 1990 (43 pages).
"Programmable Controller offers control of Stepping and Servo Motors," News Release, Control Technology, May 31, 1985, (DialogWeb search result).
"Radio Field Bus," ISA/SP50—1988-184, ISA Draft.
"Real-Time Innovations Email NewsLetter," Apr. 1998, http://www.rti.com/corporate/newsletter04-98, 2 pages.
"Ricoh to sell world's first multimedia still camera," Japan Economic Newswire, Feb. 21, 1995.
"RTI Announces Major New Component-Based Programming System for Building Complex Electromechanical Systems", PR Newswire, Mar. 16, 1998, 3 pages.
"SDRD Using 1553B Data Link Services," ISA/SP50-1988-243 (1988).
"SECS-11 Communication Board Plugs into Automation Controller," News Release, Control Technology, Aug. 26, 1985, (DialogWeb search result).
"Signal Conditioners Designed for Fisher-Rosemount System Delta V," issued by M-Systems Co., Ltd. (Dec. 1997).
"Small Multi-Tasking Controller for Cost-sensitive Aplications," News Release, Control Technology US, Nov. 8, 1988, (DialogWeb search result).
"SP88 Mes Task-Force Europe Position Document," 1994 World Batch Forum (Mar. 6-9, 1994), (pp. 1-30).
"Special Topic: PC-Based Control," A Supplement to Software Strategies, pp. 3-5, 7-8, 10-15, 20-21 (no date available).
"Suggested Outline for Application Sub-committee Document: Fieldbus Architecture Subcommittee Document," ISA/SP50—1988-175, ISA Draft. (1988).
"Sun announces availability of Javatm Embedded Server 1.0," Press Release dated Oct. 1, 1998, downloaded from java.sun.com website.
"System Provides Stepping Motor Control in Workcell Environment," News Release, Control Technology Corp., Dec. 5, 1986, (DialogWeb search result).
"Systems and Design; Technical Program and Exhibits Help Embedded Systems Design Professionals Keep Pace with Rapid Changes," PR Newswire, Dec. 27, 1995 (2 pages).
"TDC 3000 Overview," Honeywell, (approximately 1992).
"TDC 3000 Process Manager.TM.: Process Connected Solutions for the Advanced Controls Requirements of the 1990s," Honeywell, (approximately 1992).
"The 'Only' Coke Machine on the Internet," web page print-out (Feb. 12, 1999) from http://www.cs.cmu.edu/.about.coke/history_long.txt (3 pages).
"The Object Primer", Scott Ambler, pp. 1-248. Jan. 4, 1996.
"The Switzerland Coke Machine Credits," web page print-out (Feb. 12, 1999) from http://www-swiss.ai.mit.edu/htbin/coke/ (1 page).
"Toshiba Integrated Control System," Technical Manual Third Edition (Nov. 1990).
"Tour an actual TribeLink via WebManage," web page print-out from http://www.tribe.com/products/webmanage/quick_view.htm (printed on Jul. 12, 1999) (1 page).
"Tribe Announces Revolutionary Use of the Internet; Launches Innovative Remote Management Solution; New WebManage Technology Provides Network Management via World Wide Web," Business Wire, May 22, 1995.
"Tribe Computer Works' Net Products Can be Managed via World Wide Web," IAC (SM) Newsletter Database.TM., DataTrends Publications, Inc., No. 11, vol. 7, May 30, 1995.

(56) References Cited

OTHER PUBLICATIONS

"Tribe Launches First Networking Device Capable of Being Managed via Internet Web Browser; TribeLink2 Enables Remote Computing and Internet Access," Business Wire, May 22, 1995.
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeRoute," web page print-out (Jul. 12, 1999) from http://www.tribe.com/products/tr/index. (3 pages).
"TribeStar," web page print-out from http://www.tribe.com/products/tribestar/index.htm (3 pages) (copyright 1996).
"UDC 6000 Process Controller: From Stand-alone Control to Full System Integration Honeywell Has a Solution for You," Honeywell, (Aug. 1992).
"User Layer Structure," SP-50 Technical Report (Jul. 25, 1990).
"User Layer Technical Report," ISA/SP—50 1990-389C, ISA Draft.
"Wide-range, Fully Compatible Family of Process Automation & Management Systems," Copyright 1993 by Elsag Bailey Group as an Unpublished Work, (24 pages).
"Wizards wheel over SCADA systems; Supervisory Control and Data Acquisition," Control and Instrumentation, No. 12, vol. 28, Dec. 1996, p. 23.
"WWWF'94: Papers Received," web page print-out (Apr. 7, 2000) from http://www.ncsa.uiuc.edu/SDG/IT94/Agenda/Papers-received.html (8 pages).
Adler, David J. et al. "Does a Manufacturing Execution System Reduce the Cost of Production for Bulk Pharmaceuticals?" 1995 World Batch Forum (May 22-24, 1995), (13 pages).
Andrews, "15 MB in a Matchbook" (Jan. 1995) http://www.byte.com/art/9501/sec4/art5.htm.
ANSI/ASME PTC 19.1-1985, "Part 1—Measurement Uncertainty", Apr. 30, 1986, entire document.
Ash, Raymond H. et al. "Strategic Needs in Batch Manufacturing," 1995 World Batch Forum (May 22-24, 1995), (8 pages).
Bader, F. P. "Building a Better Batch Control Foundation with IEC 1131-3 Control Languages," 1994 World Batch Forum (Mar. 6-9, 1994), (23 pages).
Batch Control. Part I: Models and Terminology. (Approved Feb. 28, 1995) ISA-S88.01 1995, pp. 1-128.
Baxter, Richard V., Jr. "Implementing Open Networking in a Motor Drive," The Imbedded Internet Workshop Real World Applications Session (Oct. 1, 1999) San Jose, CA.
Beestermoller, H.J., et al. "An Online and offline programmable Multi-Loop Controller for Distributed Systems," IEEE (1994), pp. 15-20.
Benkhallat, Yazid, et al. "Interoperability of sensors and distributed systems," Sensors and Actuators A vol. 37-38 (1993), 247-254.
Benner, Stephen J. "MES in Batch Process Manufacturing. A MES Vendor view" 1995 World Batch Forum (May 22-24, 1995), (8 pages).
Berge, Jonas, "Using Ethernet is a no-brainer," In Tech: The International Journal for Measurement and Control, pp. 36-39, Jul. 2000.
Bernard, Viki, "Remote-access ware emerge: Shiva, Nortel, and Tribe leading list of innovators," PCWeek, No. 21, vol. 12, May 29, 1995, p. 47.
Berre, A., "Sharing of Objects in an Object-Oriented Language," Proceedings on the 1986 International Workshop on Object-Oriented Database Systems, IEEE Computer Society Press, Los Alamitos, CA, 1986.
Bishop, Brian. "Realtime System-Design Tool Models Electromechanical Systems", , Personal Eng & Instrumentation News, v15, n4, p. 21, Apr. 1998.
Bristol, E H., "Not a Batch Language; A Control Language!" 1995 World Batch Forum (May 22-24, 1995), (14 pages).
Brown, Jerry et al. "Meeting the Challenge of Automation Technology," 1996 World Batch Forum (May 22-24, 1995), (11 pages).
Brown, Jerry et al. "Trends and Opportunities in Batch Control System Architectures," 1994 World Batch Forum (Mar. 6-9, 1994), (pp. 1-12).

Browne, Malcolme W. "South Pole Ready for Internet Revolution," The New York Times, Section C, col. 1, p. 1, Jan. 10, 1995.
Brunn, P. "Collision Avoidance for Two Robots Sharing a Common Workspace," (1995) The Institution of Electrical Engineers.
Bullotta, Rick. "Designing Effective User Interfaces for Batch Processes," 1994 World Batch Forum (Mar. 6-9, 1994), (pp. 1-19).
Burton, P.I. "A personal history of batch control," Measurement + Control vol. 27 (Apr. 1994), pp. 69-73.
Burton, P.I., et al. "Field Bus Based on MIL-STD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93, Milan, Italy 1993.
Caro, Richard H. "Field Bus Applications," ISA (1989) Paper #89-0569, pp. 989-994.
Caro, Richard H. "The Fifth Generation Process Control Architecture," ISA Transactions vol. 28 No. 4 (1989), pp. 23-28.
Chettle, Tim. "Multiplexing techniques optimise data collection," Electrotechnology (Oct./Nov. 1995).
Choi, K.J. et al., "A Modeling Method of Software Configuration Change Control," 1997, IEEE Online, "htttp://ieeexplorer.ieee.org/stamp/stamp.jsp?tp=&arnumber=619990&userType=inst".
Cisco Systems, Inc., "Cisco Secure Wireless Plant: Security and Quality of Service for Industrial Environments," Copyright 1992-2008.
Coleman, Vernon. "National Electrical Manufacturers Association Field Bus Report to ISA SP50," (Oct. 1988) ISA/SP50-1988-234.
Computer Products "Unbundling the DCS" (approximately 1992).
Conradi, R. et al., "Version Models for Software Configuration Management," Jun. 1998, ACM Computing Surveys, vol. 30, No. 2.
Control Technology Corp. News Releases, pp. 1-23, No Date Available.
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages), 1994.
Craig, Lynn W. "SP-88 Defines Batch Control," INTECH Mar. 1994, pp. 34-37.
Crowder, R. S. "A Communication Architecture for Automation & Control," ISA, pp. 669-673. (No date available).
Crowder, R. S. "Generic Data Link Transactions for Simple Devices," Proposal to ISA SP 50 & IEC/SC65C/WG6 (Oct. 15, 1988) ISA Document.
Crowley-Milling, et al, eds. "Proceedings," 1995 International Conference on Accelerator and Large Experimental Physics Control Systems, Chicago, IL Oct. 30-Nov. 3, 1995, [cover pages].
Delahostria. Communication Model Application Layer. (Oct. 14, 1988) ISA/SP50-1988 247, ISA Draft.
Delfino, B. and Pinceti, P. "Fieldbus Applications for Electrical Industrial Systems," IEEE (1993), pp. 2084-2090.
Demetratekes, Pam. "Go with the info flow; state-of-the-art automation in the food industry; includes related article on computer software for food processors," Food Processing, vol. 57, No. 7, Jul. 1996, p. 47.
Distributed Engineering, Institute of Computer-Aided Circuit Design—Test and Test Systems Division, University of Erlangen-Nurnberg, Germany, web page print-out (8 pages) (Oct. 1994).
Dryden, Patrick, "Tribes WebManage Enables Remote Fixes," ComputerWorld, May 22, 1995, p. 14.
Duffey, C.K., et al. "High-Level Control Language Customizes Application Programs," IEEE Computer Applications in Power (1991), pp. 15-18.
Editing Committee Draft Application Layer, Version 12, Oct. 1991.
Editing Committee Draft Application Layer, Version 6, Dec. 1990.
Editing Committee Draft Application Layer, Version 8, May 1991.
Elmer-Dewitt, Philip, "Snowballs in Cyberspace; With a modem and a soldering iron, you too can build an Internet site that is really cool and totally useless," Time, Jan. 16, 1995, p. 57.
ElRakabawy, et al., "Peer-to_Peer File Transfer in Wireless Mesh Networks," University of Leipzig, Copyright 2007 (incl. English Abstract).

(56) References Cited

OTHER PUBLICATIONS

Elsag Bailey, "Elsag Bailey Automation," (in Italian) (approximately 1993).
Esprit Project 6188, "PRIAM Dictionary: Major Terms and Definitions Used in the PRIAM Project," Prenormative Requirements for Intelligent Actuation and Measurement, May 1995.
Esprit Project 8244, "User Requirements for Intelligent Transmitters and Actuators," European Intelligent Actuation and Measurement User Group, Nov. 24, 1995.
European Office Action, EP Application No. 97305187.3, dated Sep. 22, 2010.
Excerpt from the website of the Society of Manufacturing Engineers (SME)-CyberCut: A World Wide Web Based Design-to-Fabrication Tool, dated Sep. 16, 2010.
Feiler, P., "Software Process Support Through Software Configuration Management," Oct. 1990, Proceedings of the 5th International Software Process Workshop on Experience with Software Process Models, IEEE Computer Society Press.
Ferraiolo et al., A Role-Based Access Control Model and Reference Implementation Whinin a Corporate Intranet, ACM, Feb. 1999.
Fieldbus Inc. "The Foundationä fieldbus Primer," Revision 1.1, Released Jun. 24, 2001, 36 pages.
Fieldbus Standard for Use in Industrial Control Systems. Part 2: Physical Layer Specification and Service Definition. (1992) ANSI/ISA-S50.02.
Fisher, Thomas G P.E. "SP88 Update—Now and the Future," 1995 World Batch Forum (May 22-24, 1995), (59 pages).
Foster, Kirsten. "surf's up; lights, camera, but no action; Steve is a Tech-Nomad. He wanders the streets with a camera on his head. And he wants you to join him," The Independent (London), Aug. 13, 1995, p. 10.
Foxboro Fieldbus Proposal (Presented to ISA SP-50 Committee Feb. 24, 1988) ISA/SP50-1988-123B, ISA Draft.
Foxboro, "I/A Series A2TM Software-FoxCTS-Change Tracking Software-Product Specifications," 1997-2003, pp. 1-8.
Foxboro, "I/A Series Software FoxDraw," 1996 (8 pages).
Foxboro, "I/A Series Software-FoxCTSTM—Change Tracking Software-Product Specifications," 1997-2006, pp. 1-12.
Foxboro, "I/A Series—Object Manager Calls—Oct. 31, 1995," pp. 1-124.
Foxboro, "Intelligent Automation Series Human Interface Software", 20 pgs., 1997.
Friscia, Anthony et al. "MES: Manufacturing's Missing Link is a Tool for Change," 1994 World Batch Forum (Mar. 6-9, 1994), (8 pages).
Fuhr et al., "Wireless Technology Review: Radios, Frequencies, and Implications for Industry," Wireless Technology Review, Feb. 2010.
Fulcher, Jim and Dilger, Karen Abramic, "Soft control, Internet spark ISA/96," Manufacturing Systems, vol. 14, No. 12, Dec. 1996, pp. 40-46.
Furness, Harry. "Fieldbus: The Differences Start From the Bottom Up," Control Engineering (Mar. 1994), pp. 75-77.
Gaines, B.R. et al. "Mediator: an Intelligent Information System Supporting the Virtual Manufacturing Enterprise," IEEE .RTM. 1995 (XP 000586326) pp. 964-969.
George J. Thaler, et al., "Automatic Control Systems," pp. 1-60, 1989.
Gertz, Matthew, et al. "A Human-Machine Interface for Distributed Virtual Laboratories," IEEE Robotics & Automation Magazine Dec. 1, 1994 No. 4 (New York) pp. 5-13.
Gillespie, David P., Ph.D. "Comprehensive Information Management: EPA, OSHA, and Beyond," 1995 World Batch Forum (May 22-24, 1995), (14 pages).
Gleick, James. "Fast Forward: Really Remote Control," The New York Times, Section 6, col. 3, p. 42, Dec. 3, 1995.
Goldberg, Ken et al. "Desktop Teleoperation via the World Wide Web," IEEE International Conference on Robotics and Automation, pp. 654-659 (1995).
Goldberg, Ken, et al. "Beyond the Web: Excavating the Real World Via Mosaic," (Conference Paper) The Mercury Project (Oct. 17-21, 1994).
Goldberg, Ken, et al. "Beyond the Web: manipulating the real world," Computer Networks and ISDN Systems 28 (1995) pp. 209-219.
Goldstein, Ira and Hardin, Joseph, "Guest editorial," Computer Networks and ISDN Systems 28 (1995) p. 1.
Goodstein, L.P. et al., "Representation of Process State Structure and Control," Apr. 1987, Riso National Laboratory.
Grant, Dr. R. Peter, "The Impact of Reengineering on the Batch Manufacturing Workplace," 1995 World Batch Forum (May 22-24, 1995), (5 pages).
Greene, Tim. "Sahara puts Java to Management Test," Network World vol. 13, No. 7 (Feb. 12, 1996).
Gutierrez, Jose, "WirelessHART™: The Industrial Wireless Standard," Measurement and Testing, Wireless Technology Focus, Jun./Jul. 2008.
Gyorki, John R. "PLCs drive standard buses," Machine Design (May 11, 1995), pp. 83-90.
HART Communication Foundation Tech Note, "Peer to Peer Communication with WirelessHART," HCF_LIT-129 Rev. 1.0, Sep. 5, 2008.
HART Communication Foundation Tech Note, "Peer to Peer Communication with WirelessHART," HCF_LIT-129 Rev. 1.1, Mar. 5, 2010.
HART Communication Foundation Tech Note, "System Redundancy with WirelessHART," HCF_LIT-128 Rev. 1.1, Mar. 5, 2010.
HART Communication Foundation, "Wireless Hart Overview," Copyright 2009, available at: http://www.hartcomm.org/protocol/wihart/wireless-overview.html.
Hashemian, et al., "In-Situ Response Time Testing of Thermocouples", ISA 1989, Paper #89-0056, pp. 587-593.
Helson, Ron, Hart Field Communications Protocol, "Hart Tutorial: The Benefits of HART Protocol Communication in Smart Instrumentation Systems," (no date available).
Henry, "A Fault-Tolerant Interface for Self-Validating Sensors", Oxford University, Digest No. 1990/145 (Nov. 1990).
Henry, "A New Approach to Sensor Validation", IMC, Mar. 17, 1992.
Henry, "Intelligent Behaviour for Self-Validating Sensors", Advances in Measurement, pp. 1-7, May 1990.
Henry, et al., "A Standard Interface for Self-Validating Sensors", Tech. Rep. 1884/91, OUEL, University of Oxford, Sep. 1991.
Henry, et al., "Implications of Digital Communications on Sensor Validation," Tech. Rep. 1912/92, OUEL, University of Oxford, Apr. 1992.
Henry, et al., "Signal Processing, Data Handling and Communications: The Case for Measurement Validation," Tech. Rep. 1912/92, OUEL, University of Oxford, Mar. 1992.
Henry, Jim, Ph.D., P.E. "Implementation of Practical Control Systems: Problems and Solutions," web page print-out from http://chem.engr.utc.edu/Documents/MACSCITECH/MACSCITECHpaper1.html (printed on Apr. 10, 2001) (22 pages).
Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages).
Hoek, A., Heimbigner, D., and Wolf, A.L.,"A Generic, Peer-to-Peer Repository for Distributed Configuration Management", May 1996, Proceedings of the 18th International Conference on Software Engineering Publisher, IEEE Computer Society.
Hohenstein, David. "Between the host and device . . . ," Intech (Jul. 2000), (6 pages).
Holding, David and Wood, Graham. "Communications in microprocessor industrial implementation," Microprocessors and Microsystems vol. 3 No. 10 (Dec. 1979), pp. 443-451.
ICCard Design Sep./Oct. 1995.
International Search Report & Written Opinion, PCT/US09/47901, Mailed Jun. 19, 2009 (11 pages).
Invensys Operations Management, "The Trident's Main Processor and Communication Module Support Modbus, Ethernet, Peer-to-Peerr, and TriStation Protocols," Trident Communication Capabilities, (no date available).
Invensys, "FoxDraw Display Builder and Configurator", 8 pgs., 2004.
IRD Mechanalysis, Inc., "Model 816 Machinery Maintenance Data Collector," 1983, 2 pages.

(56) References Cited

OTHER PUBLICATIONS

IRD Mechanalysis, Inc., "Model 817 Machinery Maintenance Data Collector," 1984, 4 pages.
IRD Mechanalysis, Inc., "Model 818 Machinery Maintenance Data Collector," 1985, 6 pages.
Johnson, Dick. "Pressure Sensing Advances: Are They in Your Process' Future?" Control Engineering (Apr. 1995), pp. 67-72.
Johnsson, et al., "High-Level Grafcet and Batch Control", Nov. 1994, Symposium ADPM.
Kelly, D. Mark. "Digital fieldbus cluster cuts plant's wiring costs up to 20%," Intech (Apr. 1995), pp. 62-64.
Kissling, Jeffrey L. "Flexible Software Structure and Change Management," 1995 World Batch Forum (May 22-24, 1995), (16 pages).
Kline, "The Purposes of Uncertainty Analysis", vol. 107, Journal of Fluids Engineering, pp. 153-160 (Jun. 1985).
Ko, Diffu, "Trobe defines net management role for Web browser software," Network World, May 22, 1995, p. 14.
Kohler H. J., et al.,"Integrating UML Diagrams for Production Control Systems," ACM p. 241-251, 2000.
Kostas, et al., "Real-Time Voice Over Packet-Switched Networks", pp. 18-27, IEEE Network (Jan./Feb. 1988).
Koth, H. and Oeder, K. "The Advantages of Intelligent Field Modules for Nuclear Power Plant Operation and Maintenance," Kemtechnik 60 (1996) 5-6, pp. 215-219.
Lenhart, Gerald W. "A Field Bus Approach to Local Control Networks," ISA, Paper #93-281 1993.
Lenhart, Gerald W. "Fieldbus-Based Local Control Networks," INTECH (Aug. 1994), p. 31-34.
Leon, Mark, "Tektronix to add Web software on new printers," InfoWorld, Dec. 4, 1995, p. 6.
Loos, Peter. "Production Management—Linking Business Applications to Process Control," 1995 World Batch Forum (May 22-24, 1995), (pp. 1-16).
Loose, Graham. "Fieldbus—the user's perspective," Measurement + Control vol. 27 (Mar. 1994), pp. 47-51.
Loupos, Konstantinos et al., "VR, HF and Rule-Based Technologies Applied and Combined for Improving Industrial Safety," Lecture Notes in Computer Science, vol. 4555, Universal Access in Human-Computer Interaction, Ambient Interaction, pp. 676-680 (2007).
Lu, S. et al., "An Object-Oriented Power Plant Adaptive Control System Design Tool," Sep. 1995, IEEE Transactions on Energy Conversion, vol. 10, No. 3.
Magnusson, B., Asklund, U., and Minor, S., "Fine-Grained Revision Control for Collaborative Software Development", Dec. 1993, Proceedings of the 1st ACM SIGSOFT Symposium on Foundations of Software Engineering, ACM.
Martin, "Design and Strategy for Distributed Data Processing", Chptrs. 19 & 20, pp. 272-305 (1981).
Maser, K. et al., "Development of a Wireless Global Bridge Evaluation and Monitoring System (WGBEMS)," Building of International Community of Structural Engineers, vol. 2, Proceedings of Structures Congress XIV Apr. 15-18, 1986, American Society of Civil Engineers, Chicago IL, 8 pages.
Meeting Minutes, Ad Hoc Function Block Meeting, Jun. 14, 1990, Chapel Hill, NC (pp. 1-60).
Meeting Minutes, Process Control Working Group of SP50.4, Jan. 21-23, 1991, Atlanta, GA (8 pages).
Meeting Minutes, SP50, International Electrotechnical Commission, Technical Committee No. 65: Industrial-Process Measurement and Control, Sub-Committee 65C: Digital Data Communications for Measurement and Control and Working Group 6: Field BusStandard for Use in Industrial Control Systems, Feb. 28-Mar. 4, 1988, Scottsdale, Arizona (143 pages).
Meeting Minutes, SP50, Signal Compatibility of Electrical Instruments, Dec. 5-7, 1990, Orlando, FL (64 pages).
Meeting Minutes, SP50.4 Application Layer, Oct. 19-21, 1988, Houston, TX (96 pages).
Meeting Minutes, Windows Working Group of Application Subcommittee, Mar. 1-3, 1989, New Orleans, LA (pp. 1-8).

Mirabella, Orazio. "A Short Presentation of IEC Fieldbus Application Layer," Informatics and Communication Institute, Engineering Faculty, University of Catania, Italy, Feb. 14, 1995.
Miyoshi et al., "A Real-Time Java Server for Real-Time Match", 1997, IEEE, pp. 319-325.
Momal, F. and Pinto-Pereira, C. "Using World-Wide-Web for Control Systems," from Proceedings 1995 International Conference on Accelerator and Large Experimental Physics Control Systems, Chicago, IL., Oct. 30-Nov. 3, 1995.
Morel, G., et al. "Discrete Event Automation Engineering: Outline of the PRIAM Project." BIAS '93, vol. 1, pp. 105-116, MILAN, Nov. 23-25, 1993.
Mori, et al., "The PCMCIA Developer's Guide, Second Edition," Sycard Technology 1994.
Niagara Framework, http://www.tridium.com/products/niagara.asp, Feb. 10, 2005, 2 pages.
NOAH: Network Oriented Application Harmonisation based on General Purpose Field Communication System. Project description rev. 1.0, Oct. 25, 1995. P-NET, PROFIBUS, WorldFIP.
Nobuhiko, Tsuji, et al. "An Advanced Optical Fieldbus Instrumentation System Using 16×16 Reflection Type Optical Star Coupler and Low Powered Transmitter," pp. 755-764, (1995).
Notte, Angelo J. "Multitasking Capability Simplifies Process Control Design" Reliance Electric Company, approximately late 1980s.
Object-Oriented Information Systems Planning and Implementation, David A. Taylor, Wiley Professional Computing, published Apr. 10, 1992, pp. 1-357.
Ochoa, David. "Effects of Alliances and Acquisitions on the Batch Automation User," 1995 World Batch Forum (May 22-24, 1995), (43 pages).
Office Action mailed Dec. 26, 2002, U.S. Appl. No. 09/379,074.
Office Action mailed Feb. 1, 2008, U.S. Appl. No. 10/765,006.
Office Action mailed Apr. 23, 2002, U.S. Appl. No. 09/379,074.
Office Action mailed Jul. 2, 2007, U.S. Appl. No. 10/765,006.
Office Action mailed Sep. 24, 2003, U.S. Appl. No. 09/379,074.
Output to Valve, Revision No. 1.4, Jan. 18, 1991, (Draft Document), Instrument Society of America.
Owen, S., et al. "A modular reconfigurable approach to the creation of flexible manufacturing cells for educational purposes," Fast Reconfiguration of Robotic and Automation Resources (Colloquium) Oct. 20, 1995, The Institution of ElectricalEngineers.
Pace, Hugh W. "Valve Actuators Ready for Fieldbus," Control Engineer (Oct. 1995), pp. 65-73.
Pages from Aspentech.com website as of Apr. 1999, retrieved from Internet archive http://web.archive.org.
Pages from Aspentech.com website as of Dec. 1997, retrieved from Internet archive http://web.archive.org.
Pages from Aspentech.com website as of Dec. 1998, retrieved from Internet archive http://web.archive.org.
Pages from Aspentech.com website as of Jan. 1997, retrieved from Internet archive http://web.archive.org.
Pages from Aspentech.com website as of Mar. 2000, retrieved from Internet archive http://web.archive.org.
Pages from Aspentech.com website as of Oct. 1996, retrieved from Internet archive http://web.archive.org.
Pages from SL.com website as of Apr. 1999, retrieved from Internet archive http://web.archive.org.
Pages from SL.com website as of Dec. 1998, retrieved from Internet archive http://web.archive.org.
Pages from SL.com website as of Feb. 1997, retrieved from Internet archive http://web.archive.org.
Pages from SL.com website as of May 2000, retrieved from Internet archive http://web.archive.org.
Pappalardo, Denise, "Digi Introduces IP/IPX Router," InternetWeek, Apr. 24, 1995, p. 15.
Pappalardo, Denise, "Router Can Be Managed via Net," InternetWeek, May 22, 1995, p. 6.
Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

(56) References Cited

OTHER PUBLICATIONS

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.
Pfeifer T. and Fussel B. "Sensorbetriebssystem fur messtechnische Problemstellungen in der Produktionstechnik," Technisches Messen vol. 58 (1991) Nos. 7/8.
Phinney, Thomas L. "An Analysis of Contending Proposals in ISA SP-50 for an ISA/IEC Field Instrument Bus," ISA (1988) Paper #88-1489.
Pinto, Jim. "The Great Fieldbus Debate—is Over," Action Instruments (www.actionio.com) (originally published in Industrial Controls Intelligence, Nov. 1999).
Preface: Field Bus Process Control User Layer Technical Support, Feb. 28, 1991.
Press Release from Real-Time Innovation announcing ControlShell version 6.0 for sale/for use, Apr. 1998, 2 pages.
Product Specification, I/A Series.RTM. RBATCH II, Aug. 31, 1994 (Revised Apr. 1995).
Product Specifications, I/A Series(R) Software FoxGuard(TM) Manager for Triconex(TM) Safety Systems, Copyright 2000-2006, Invensys Systems, Inc.
PROWAY-LAN Industrial Data Highway. (Approved Feb. 3, 1986) ISA—S72.01-1985.
Redman, Jun, et al. "Intranet and the internal Web server: A standard user interface for integrating manufacturing applicaitons," Proceedings of the Industrial Comuting conference, vol. 6, No. 1 (1996).
Reklaitis, G. V. "Scheduling Approaches for the Batch Process Industries," 1995 World Batch Forum (May 22-24, 1995), (17 pages).
Renu Electronics Pvt. Ltd., "GWY-800 (HART Gateway) User Manual," Rev. 0, Jul. 13, 2006.
Report from IEC TC65 Working Group 6 Function Blocks, May 1, 1995.
Robinson, D. et al., "Modelling and Synthesis of Configuration Controllers for Dynamically Reconfigurable Logic Systems Using the DCS CAD Framework," 1999, Field-Programmable Logic and Applications, FPL '99, pp. 41-50.
Rodriguez, Karen, "Tribe sets software," Interactive Age, vol. 2, No. 15, May 22, 1995, p. 25.
Rosenof, Howard P. "Dynamic Scheduling for a Brewery," 1995 World Batch Forum (May 22-24, 1995), (6 pages).
Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out fromhttp://www.ncsa.uiuc.edu/SDG/IT94/Proceedings/CSCW/scharf/scharf.html (8 pages), 1994.
Schreiber Philip et al. "Process Automation Using SP88," 1995 World Batch Forum (May 22-24, 1995), (7 pages).
Schuur, C. "Comments on 'Analysis and Suggestions for ISA-SP50' as submitted to the SP50 Committee by Honeywell Inc." (Mar. 11, 1988) ISA-SP50—1988-155, ISA Draft.
Schuur, Chris and Warrior, Jay. "Phillips Token Passing Field Bus Controller Timed Token Mode," ISA/SP50—1988-186, ISA Draft. (1988).
Silverman, Dwight. "'Attaboy' for the best software and hardware of 1994," The Houston Chronicle, Dec. 25, 1994, p. 2.
Skabowski, E. L. "Recommendations for Consideration at Oct. 1988 Application Layer Subcommittee Meeting," (Oct. 3, 1988).
Slater, A. F. "Controlled by the Web," Computer Networks and ISDN Systems 27 (1994) pp. 289-295.
Smith, Chris. "Tektronix Pushes Ease-of-Use and Low Cost of Operation With Its New Phaser.RTM. Color Laser Printer," comp.newprod forum (Jan. 11, 1996).
Smith, S. et al., "Cyber Cut: A world wide web based design-to fabrication tool", Journal of Manufacturing Systems, vol. 15/No. 6, Jan. 1, 1996, pp. 432-442.
SNAP Foundation Template "Using the SNAP Development Environment," Version 8.0, Chapters 1-4, 1997.
Solvie, Michael J. "Configuration of Distributed Time-Critical Fieldbus Systems," IEEE (1994), p. 211.
Song, Jianping et al., "Challenges of Wireless Control in Process Industry," Workshop on Research Directions for Security and Networking in Critical Real-Time and Embedded Systems, Apr. 4, 2006, San Jose, CA, USA; available at http://moss.csc.ncsu.edu/~mueller/crtes06.
Soreide, N. N., et al. "Mosaic access to real-time data from the TOGA-TAO array of moored buoys," Computer Networks and ISDN Systems 28 (1995), pp. 189-197.
Stapleton, Nick. "802.3 Working Group DTE Power via MDI Call for interest," 3Com (Jul. 1999), (15 pages).
Stein, R. et al. "Development of a Commercially Successful Wearable Data Collection System," University of CA San Diego, Downloaded Jan. 12, 2009, 7 pages.
Stevens, et al. "TCP/IP Illustrated, vol. 1. The Protocols," TCP/IP Illustrated vol. 1, XP-002106390, pp. 85-96. (1994).
Strack, Bob. "The HAWK is Soaring," Chemical Processing (May 1996) p. 11.
Strobhar, David A. "Evolution of Operator Decision Making," 1995 World Batch Forum (May 22-24, 1995), (6 pages).
Strothman, Jim and Ham, John. "Alliances, Fieldbus, Windows Stir ISA/94 Anaheim Pot," INTECH (Dec. 1994), pp. 32-35.
Strothman, Jim and Ham, John. "ISA/95 New Orleans: 'Open', NT winds (not Opal) blow strong," INTECH (Nov. 1995), pp. 45-48.
Table of Contents, Automation & Technology Department, 1993.
Table of Contents, Automation & Technology Department, 1995.
Table of Contents, Industrial Computing Society Conference ICS/95, New Orleans, LA, Oct. 1-6, 1995.
Table of Contents, ISA '88 International Conference and Exhibit, Houston, TX, Oct. 16-21, 1988.
Table of Contents, ISA '89 International Conference and Exhibit, Philadelphia, PA, Oct. 23, 1989.
Table of Contents, Proceedings of the 20th International Conference on Industrial Electronics Control and Instrumentation, vols. 1-3, Sep. 5-9, 1994, Bologna, Italy.
Table of Contents, Proceedings of the 7th Mediterranean Electrotechnical Conference, vol. 1, Apr. 12-14, 1994, Antalya, Turkey.
Table of Contents, Proceedings of the Industrial Computing Conference, vol. 3, Sep. 19-24, 1993, Chicago, IL. Industrial Computing Society.
Taylor, Ken and Trevelyan, James, "A Telerobot on the World Wide Web," printed from http://telerobot.mech.uwa.edu.au/ROBOT/telerobo.htm (14 pages) (1995).
The Foxboro Company, "FoxCMS Change Management System Software," 48 pgs., Aug. 14, 1996.
Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).
Tinham, Brian, "Getting SCADA by web browsner? Supervisory Control and Data Acquisition," Control and Instrumentation, No. 12, vol. 28, Dec. 1996, p. 5.
Tobin, David. "Southeast Paper Installs Largest Foxboro Distributed Control System." (No date available).
Toner, Mike. "Web's view of world far and wide," The Houston Chronicle, Nov. 5, 1995, p. 6.
Tweney, "Java on Your Mobile Phone?", http://www.business2.com (Mar. 14, 2002).
U.S. Appl. No. 09/573,151, filed May 17, 2000, Linscott, Richard L.
United States Patent and Trademark Office final Office Action for U.S. Appl. No. 11/354,586, mailed Aug. 4, 2009.
United States Patent and Trademark Office final Office Action for U.S. Appl. No. 11/354,586, mailed Jul. 1, 2008.
United States Patent and Trademark Office final Office Action for U.S. Appl. No. 11/781,216, mailed Jan. 8, 2009.
United States Patent and Trademark Office final Office Action for U.S. Appl. No. 11/781,218, mailed Jan. 28, 2009.
United States Patent and Trademark Office final Office Action for U.S. Appl. No. 11/781,219, mailed Nov. 14, 2008.
United States Patent and Trademark Office non-final Office Action for U.S. Appl. No. 11/354,586, mailed Jan. 8, 2009.

(56) References Cited

OTHER PUBLICATIONS

United States Patent and Trademark Office non-final Office Action for U.S. Appl. No. 11/354,586, mailed Mar. 6, 2007.
United States Patent and Trademark Office non-final Office Action for U.S. Appl. No. 11/354,586, mailed Nov. 1, 2007.
United States Patent and Trademark Office non-final Office Action for U.S. Appl. No. 11/781,216, mailed Aug. 7, 2008.
United States Patent and Trademark Office non-final Office Action for U.S. Appl. No. 11/781,219, mailed Jul. 14, 2008.
United States Patent and Trademark Office non-final Office Action for U.S. Appl. No. 11/207,816, mailed Apr. 9, 2007.
United States Patent and Trademark Office non-final Office Action for U.S. Appl. No. 11/207,816, mailed Jan. 10, 2008.
United States Patent and Trademark Office non-final Office Action for U.S. Appl. No. 11/207,816, mailed. Jul. 3, 2008.
United States Patent and Trademark Office non-final Office Action for U.S. Appl. No. 11/207,816, mailed Oct. 4, 2006.
United States Patent and Trademark Office non-final Office Action for U.S. Appl. No. 11/207,816, mailed Sep. 19, 2007.
United States Patent and Trademark Office non-final Office Action for U.S. Appl. No. 11/781,218, mailed Sep. 15, 2008.
United States Patent and Trademark Office non-final Office Action for U.S. Appl. No. 11/781,219, mailed Jul. 21, 2009.
Van de Pol. "OmniChem: Real Time Production scheduling in a batch oriented environment," 1994 World Batch Forum (Mar. 6-9, 1994), (23 pages).
Vardy, Joel M. "Integrating Manufacturing Into the Corporate Reengineering Effort for the Batch Industries," 1995 World Batch Forum (May 22-24, 1995), (23 pages).
Wang, Lithui et al. "Agent-based Intelligent Control System Design for Real-time Distributed Manufacturing Environments". Agent-basedManufacturing Workshop, Autonomous Agents '98. Minneapolis/St. Paul, May 9-13, 1998, pp. 152-159.
Webb, Marcus. "Computer System Implementation, Batch Standards and Validation," 1995 World Batch Forum (May 22-24, 1995), (11 pages).
Weinert, A., et al. "RR/OS—realtime programming and application environment for the COSY control system," Nuclear Instruments and Methods in Physics Research A vol. 352 (1994), pp. 277-279.
Welch, Nathalie, "Tribe to manage via Web; Tribe Computer Works Inc.'s TribeLink2 Product Announcement," MacWEEK, vol. 9, No. 21, May 22, 1995, p. 18.
WG1 List of Criteria (Appendix 1), (Oct. 21, 1988) ISA/SP50-1988-242, ISA Draft.
Wilder, Clinton, "Network Management: Russing Nets Via the Web—Trib's WebManage uses popular interface," InformationWeek, May 29, 1995, p. 62.
Williams, Gary, "Wireless Plant and Backhaul in the Industrial Environment," Invensys Operations Management, (no date available).
Wolfe, Alexander, "Strong Brew," Electronic Engineering Times, Apr. 8, 1996, p. 73.
Wood, G. G. "Current Fieldbus activities," computer communications vol. 11 (Jun. 1988) No. 3, pp. 118-123.
Wood, G. G. "Evolution of communication standards for the process industry," Measurement + Control vol. 19 (Jul./Aug. 1986), pp. 183-188.
Wood, G. G. "Survey of LANs and Standards," Computer Standards & Interfaces vol. 6 (1987), pp. 27-36.
Wood, G. G. "The Argus Consul System for On-Line Computer Control," Electrical Engineering Transactions (Mar. 1969), pp. 114-118.
Wood, G. G. "The Challenge of Standards for Plant Communication," IFAC Distributed Computer Control Systems (1982), pp. 191-192.
Wood, G. G. "Towards digital information control," Measurement + Control vol. 21 (Jul./Aug. 1988), pp. 179-180.
Wood, Graeme G. "Data Transmission, Processing and Presentation," pp. 46-54 (no date available).
Wood, Graeme, G. "Standardisation Work for Communication Among Distributed Industrial Computer Control Systems—A Status Report," INRIA (1984), pp. 67-69.
Wood, Graeme. "Fieldbus Status 1995," Computing & Control Engineering Journal (Dec. 1995), pp. 251-253.
Wood, Graeme. "Generic Link Transactions for Simple Devices in Fieldbus." ISA/SP50—1988—240 (Sep. 20, 1988).
Young, Stephen L. "Technology . . . The Enabler for Tommorrow's Agile Enterprise," 1995 World Batch Forum (May 22-24, 1995), (10 pages).
Zeff, Joe. "Maui Sunset in Real Time (Modems not Optional)," The New York Times, Nov. 27, 1995, Section D, col. 2, p. 5.
Zeller, A. and Snelting, G., "Unified Versioning Through Feature Logic," Oct. 1997, Transactions on Software Engineering and Methodology, vol. 6, Issue 4, ACM.
Hiertz, Guido et al., "IEEE 802.11s: The WLAN Mesh Standard," IEEE Wireless Communications, pp. 104-111, Feb. 2011.
User Guide for IntelaTrac 2000: Automated Field Data Collection Solutions, Rev. 1.0, Nov. 30, 1999.
International Search Report & Written Opinion, PCT/US09/47901, Mailed Jun. 19, 2009, 11 pages.

\* cited by examiner

SYSTEMS AND METHODS FOR IMMERSIVE INTERACTION WITH ACTUAL AND/OR SIMULATED FACILITIES FOR PROCESS, ENVIRONMENTAL AND INDUSTRIAL CONTROL

REFERENCE TO RELATED APPLICATIONS

This application claims the benefit of priority of U.S. Provisional Patent Application Ser. No. 61/074,472, filed Jun. 20, 2008, entitled "Immersive Training Simulator," and U.S. Provisional Patent Application Ser. No. 61/155,160, filed Feb. 25, 2009, entitled "Systems and Methods for Immersive Interaction with Actual and/or Simulated Facilities for Process, Environmental and Industrial Control."

BACKGROUND OF THE INVENTION

The invention pertains to digital data processing and, more particularly, by way of non-limiting example, to immersive interaction with actual and simulated environments. The invention has application, for example, in operation, maintenance and emergency response training for plants and other facilities utilizing process, environmental control, or other industrial and/or non-industrial control.

Facilities dependent on process, environmental, industrial and other control technologies are becoming increasingly complex. This includes multi-acre product assembly plants, pharmaceuticals factories, oil refineries, power plants and other large industrial operations. It also includes sky scrapers and other building complexes with intricate power, climate control, people-mover and other infra-structure "plants." These are among the facilities that rely on "control" or "control systems" to monitor their characteristics and, thereby, to insure that output, processing, quality and/or efficiency remain within desired limits over the course of time.

Those systems may include many components, from field devices and controllers to workstations and other, more powerful digital data processing apparatus, the functions of which may overlap. Field devices include temperature, flow and other sensors that measure characteristics of the subject device, process or system. They also include valves and other actuators that mechanically, electrically, magnetically, or otherwise effect the desired control. Controllers generate settings for the control devices based on measurements from sensor-type field devices. Controller operation is typically based on a "control algorithm" that maintains a controlled system at a desired level, or drives it to that level, by minimizing differences between the values measured by the sensors and, for example, a set-point defined by the operator. Workstations, control stations and the like are typically used to configure and monitor the process as a whole. They are often also used to execute higher-levels of process control, e.g., coordinating groups of controllers and responding to alarm conditions occurring within them.

One or more of these control system components may include software and/or hardware logic to monitor characteristics of the facilities that they control and to automatically adjust their operational parameters to insure these limits are achieved. Others display alarms or other indicia of the characteristics, leaving responsibility for adjustment to plant operators or other personnel.

In a petroleum refinery, for example, thousands of controllers physically distributed over acres of the plant may monitor and actuate tens of thousands sensors, actuators and other field devices to transport raw incoming crude for processing. The controllers are, in turn, coordinated by workstations and larger digital data processing equipment to move desired quantities of the crude at desired rates to available boilers and distillate columns. Field devices in and around those boilers and columns monitor the processing parameters to maximize distillate production and to move to the resultant gasoline, diesel fuel and other co-products for downstream processing. Plant personnel monitor and control these operations from workstations in a central control room and strategically disposed control stations. They also perform continual walk-throughs of the refinery for on-hand inspection, adjustment, and maintenance of the equipment. In the event of emergency, emergency response crews execute manual and machine overrides while, at the same time, rescuing those in harm's way.

Whether for a petroleum refinery, an assembly plant, or other complex facility, training personnel for operation and maintenance tasks can be very expensive, especially, given the intricacies introduced and imposed by the underlying process, environmental, industrial and other control technologies. These expenses are compounded when training emergency responders, some of who may have little or no day-to-day familiarity with the facility, are taken into account. In addition to training, there is considerable added expense for putting personnel in on the "floor" to conduct walk-throughs for routine monitoring, maintenance and the like.

An object of the invention is to provide improved systems and methods for digital data processing.

A related object is to provide such systems and methods for immersive interaction with actual and simulated environments.

A still further related object is to provide such systems and methods for use in the operation, maintenance and emergency response.

Another such related object is to provide such systems and methods as can be used training personnel for operation, maintenance and emergency response.

Yet a still further related object is to provide such systems and methods as can be used in facilities utilizing process, environmental control, or other industrial and/or non-industrial control.

Still yet a further object is to provide such systems and methods as reduce costs associated with operation, maintenance and emergency response and/or training personnel therefore.

SUMMARY OF THE INVENTION

The foregoing are among the objects attained by the invention, which provides in some aspects systems for interaction with a control environment that includes controlled equipment along with control devices that monitor and control that controlled equipment. According to some of those aspects, such a system includes first functionality that generates output representing an operational status of the controlled equipment, as well as second functionality that generates output representing an operational of one or more of the control devices. An engine coordinates the first functionality and to the second functionality to generate an operational status of the control environment.

A virtual reality environment generates, as a function of that operational status and one or more physical aspects of the control environment, a three-dimensional ("3D") display of the control environment. The virtual reality environment is responsive to user interaction with one or more input devices to generate the 3D display so as to permit the user to interact with at least one of the control devices and the controlled equipment at least as represented by the 3D display of the control environment. The engine applies to at least one of the first and second functionality indicia of those interactions to discern resulting changes in the operational status of the control environment. It applies indicia of those changes to the virtual reality environment to effect corresponding variation in the 3D display of the control environment—i.e., variation indicative of the resulting change in the control environment.

The virtual reality environment, according to aspects of the invention, displays the control environment as the participant would see it in actuality, i.e., as if he/she were really there. As a result, systems according to the invention a user to experience, via the 3D display of the control environment, interaction with and travel through (e.g., a "walk-through") the control environment—which maybe actual or simulated. They can be used to monitor and control operational parameters of the environment and to support training of plant or other of personnel, e.g., first responders or other safety personnel.

Further aspects of the invention provide systems, for example, as described above, in which physical aspects of the control environment are reflected in a CAD/CAM database and/or a three-dimensional laser scan of at least a portion of the control environment, i.e., of one or more of the controlled equipment and/or control devices. In related aspects of the invention, those physical aspects may be reflected in a plurality of two-dimensional images of at least a portion of the control environment. This may be, for example, a database containing hundreds or thousands of images of a plant that includes the controlled equipment and/or control devices, and functionality is provided in some aspects of the invention for generating a three-dimensional representation of the control environment from those images.

Still other aspects of the invention provide systems as described above in which the virtual reality environment augments the 3D display of the control environment by (i) superimposing graphics on representations of one or more controlled equipment and/or one or more control devices, and/or (ii) altering the representational displays of controlled equipment, control devices and/or other objects to give the user the impression of seeing into, through and/or around them.

The superimposed graphics, which can include, for example, graphs, equations and other visual aids, can be based on simulated and/or actual operational data for the controlled equipment and/or control devices. The superimposed graphics can also include still and/or video images taken by fixed or mobile cameras (including, by way of non-limiting example, still or video cameras included in mobile phones, personal digital assistants, or PDAs and other such devices that maybe carried by personnel in or around the control environment.

The altered representational displays can, likewise, be based on such simulated and/or actual operational data, e.g., representing the inner workings and/or "behind the scenes" operation of the control devices, the controlled equipment (and the materials they process).

Benefits of system according to foregoing (and other) aspects of the invention are their ability to generate 3D displays of the control environment that not only represent the behavior of the controlled equipment and/or control devices, but do so in a manner that is in agreement with the actual or simulated condition of the control environment.

In still other aspects, the invention provides systems as described above in which the first and/or second functionalities are coupled to any of configuration and a modeling database ("configuration" database), an application database and a runtime database. Such a configuration database can include, for example, one or more control strategies for one or more of the controlled equipment and/or control devices. The application and/or runtime databases can include, for example, simulated and/or actual current operational data for the controlled equipment and/or control devices. Those database(s) may include, instead or in addition, simulated and/or actual historical operational data for the devices and/or equipment.

Yet, in still other aspects, the first functionality includes dynamic simulation software or other functionality that simulates operation of one or more of the controlled equipment. That simulation software may be, for example, a solver or other system for solving mathematical systems of equations.

In related aspects of the invention, the second functionality comprises software or other functionality that simulates operation of one or more of the control devices.

Still further aspects of the invention provide a systems as described above that additionally include a control room workstation or other digital data processor that monitors and/or controls user interaction with the control devices and/or controlled equipment as represented in the 3D display of the control environment. Such a workstation can be used, for example, by a supervisor, training instructor, co-tranine or other person. To that end, the control room digital data processor can be adapted to enable its users to witness effects of interaction between users of the virtual reality environment with respect to at least one of the control devices and the controlled equipment, e.g., as represented by the 3D display. Likewise, the virtual reality environment can be adapted to enable its users to witness effects of actions by users of the control room digital data processor, again, for example, with respect to at least one of the control devices and the controlled equipment, e.g., as represented by the 3D display.

Still further aspects of the invention provide methods for operating and using systems as described above.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
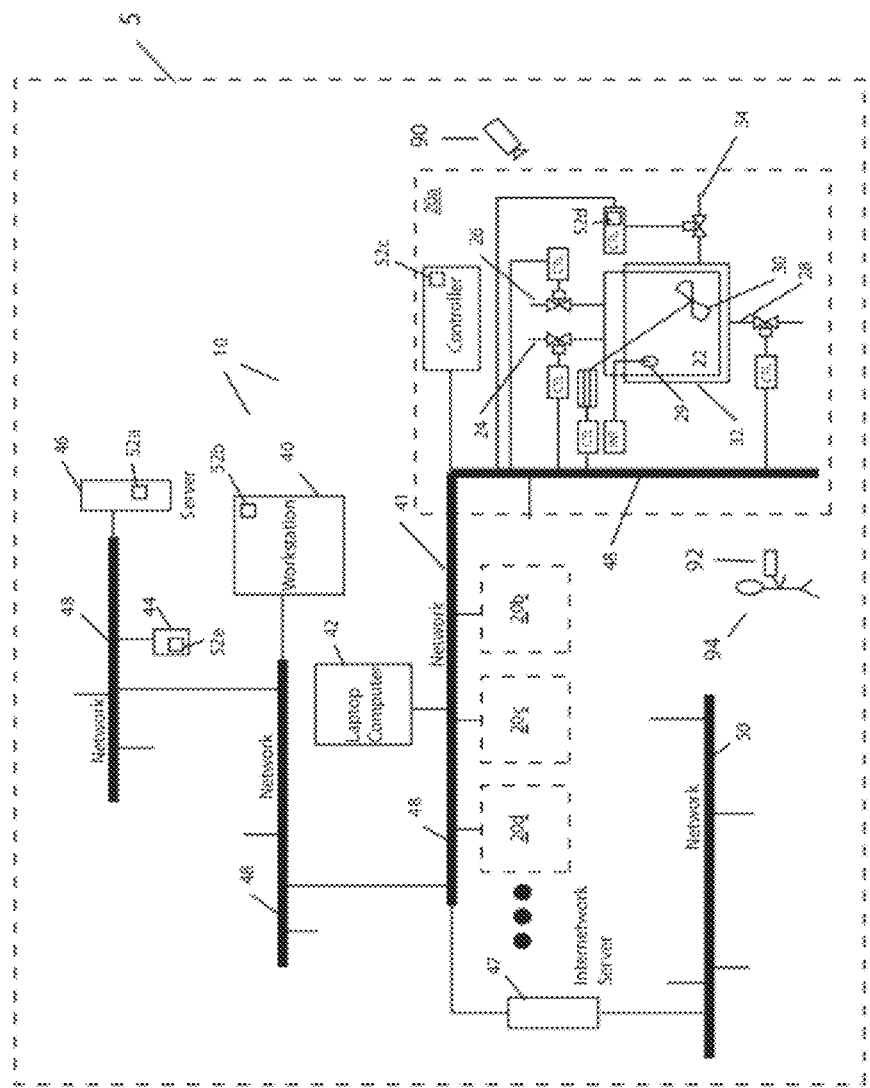
FIG. 1 depicts an environment of the type with which systems and methods of the invention are practiced.

FIG. 1 depicts an environment 5 of the type with which systems and methods of the invention are practiced. The illustrated environment, all or parts of which may be actual or simulated, comprises a control system 10 and a facility controlled by that system 10.

That facility is represented, here, by processing stations 20a-20d, etc., of the type used in a pharmaceuticals factory, though, in other embodiments, the facility may be an assembly plant, oil refinery, power plant or other industrial or non-industrial operation (such as, by way of non-limiting example, a building complex) that relies on control to monitor characteristics of the controlled equipment, the materials or other things processed by them, the processes by which they are processed, and/or the elements of the control system 10, itself, to insure that output, processing, quality and/or efficiency remain within desired limits over the course of time.

Returning to the drawing, illustrative station 20a of the illustrative pharmaceuticals factory includes mixing chamber 22, fluid inlets 24, 26, fluid outlet 28, paddle 30, cooler 32, and cooler inlet 34. The other processing stations, of which there may be zero or more, may be similarly configured or otherwise.

Illustrated system 10 includes networked control devices that monitor and controlled equipment 22-32, the materials or other things processed by them, the processes by which they are processed, and/or the elements of the control system 10, itself, as discussed above. The control devices of illustrated system 10 perform such monitoring and control in accord with process control techniques of the type known in the art. In other embodiments, the control devices may instead or in addition exercise environmental control, or other industrial and/or non-industrial control technologies.

The illustrated control devices include actuator-type field devices ("actuators"), such as the valves depicted as controlling inlets and outlets 24-28 and 34. A further actuator is shown controlling paddle 30. These and other actuators utilized by the control system are constructed and operated in the conventional manner, as modified in accord with the teachings hereof. The actuators of the illustrated embodiment operate under control of respective field device controllers, labeled CTL, that are also constructed and operated in the conventional manner to provide initialization, signal conditioning and communications functions.

Rather than using separate controllers CTL, the actuators can be of the intelligent variety and can include integral microprocessors or other digital data processing apparatus for control, initialization, signal conditioning, communications and other control-related functions. For sake of convenience, the label CTL is used regardless of whether the control-related functionality is integral to the actuators (e.g., as in the case of intelligent actuators) or otherwise.

The Illustrated control devices include sensor-type field devices ("sensors"), such as temperature sensor 29 that monitors a temperature, level or other characteristic of fluid in chamber 22. The sensor 29, as well as other sensors and sensing apparatus utilized by the system, are constructed and operated in the conventional manner known in the art, as modified in accord with the teachings hereof. They can be coupled to the control network via a transmitter or other interface device INT that, too, is constructed and operated in the conventional manner, as modified in accord the teachings hereof. The interface devices facilitate initialization, signal conditioning and communications between the sensors and the control system. As above, one or more sensors can be of the intelligent variety, incorporating integral microprocessors or other digital data processing capabilities for initialization, signal conditioning, communications and other control-related functions. Here, too, the label INT is used in reference to the control-related functionality, regardless of whether embodied in an intelligent transmitter or otherwise.

The networked control devices include one or more controllers 36 that monitor and control respective aspects of the hypothetical pharmaceuticals plant in the conventional manner, as modified in accord with the teachings hereof. The controllers can comprise mainframe computers, workstations, personal computers, special-purpose hardware or other digital data processing apparatus capable of performing such monitoring and control functions, as adapted in accord with the teachings hereof. Preferred controllers are constructed and operated in the manner of the CP control processors commercially available from the assignee hereof, as modified in accord with the teachings herein.

The control system 10 includes a variety of devices that serve as user interfaces and that provide configuration and/or control functions, all in the conventional manner as modified in accord with the teachings hereof. Illustrated for these purposes are workstation 40, laptop computer 42 and handheld computer 44. These devices can provide configuration and control functions directly, as in the case of workstation 40, or in cooperation with server devices, e.g., as in the case of handheld computer 44 and server 46. Apparatus 40-44 can couple with the control network directly, e.g., via bus or network connection, or indirectly, e.g., via satellite, wireless connection or modem connection.

Illustrative control devices 36-46, CTL and INT are coupled for communications via a medium that permits at least selected ones of the devices to communicate with one another. To this end, in the illustrated embodiment those devices are coupled via one or more networks 48 that are, preferably, IP-based such as, by way non-limiting example, Ethernets (e.g., local area networks, wide area networks, metropolitan area networks, and the like, by way of non-limiting example). The network(s) can include, as indicated in the drawing, multiple segments such as various wide and local area networks. They may also include high and/or low bandwidth components, such as phone lines, and low and/or high latency components, such as geosynchronous satellites networks. One or more of the control devices 36-46 and/or networks 48 can be further coupled to the Internet 50 or other networks via internetwork server 47, or otherwise.

Control system 10, including illustrative devices 36-48, may be of the type known in the art and commercially available, by way of non-limiting example, from the assignee hereof. One such control system is described, again, by way of non-limiting example, in U.S. Pat. No. 6,788,980, the teachings of which are incorporated herein by reference.

As per convention in the art, one or more databases contain model(s) of the control system 10 and apparatus at the facility controlled by it and, more particularly, by way of example, models of controlled equipment 22-32, the materials or other things processed by them, the processes by which they are processed, and/or the elements of the control system 10, including, for example, control devices 36-46—including the control strategy executed by them. Thus, for example, such a model enumerates field devices, control devices, controllers and other apparatus that perform control, specifying their interrelationships and the information transferred between and among them, as well as detailing the calculations and methodology they apply for purposes of control.

Such models can be generated by configurators of the type known in the art (e.g., as disclosed in U.S. Pat. Nos. 7,096,465, entitled "Process Control Configuration System with Parameterized Objects," and 6,788,980, entitled "Methods and Apparatus for Control Using Control Devices That Provide a Virtual Machine Environment and That Communicate Via an IP Network," the teachings of both which are incorporated herein by reference), or otherwise. These models can be stored in central databases and/or distributed among control devices 36-46, e.g., as disclosed in aforementioned, incorporated-by-reference U.S. Pat. Nos. 7,096,465 and 6,788,980, as well as in PCT Application WO03/89,995, entitled "Methods and Apparatus for Process, Factory-Floor, Environmental, Computer Aided Manufacturing-Based or Other Control System With Real-Time Data Distribution," the teachings of which are also incorporated herein by reference.

In addition to configuration or modeling database(s), the system can include one or more application databases and/or runtime databases, e.g., of the type disclosed in aforementioned, incorporated-by-reference PCT Application WO03/89,995, to maintain inter alia current and/or historical operational or other information regarding the control system 10 and apparatus at the facility controlled by it and, more particularly, by way of example, controlled equipment 22-32, the materials or other things processed by them, the processes by which they are processed, and/or the elements of the control system 10, including, for example, control devices 36-46—including the control strategy for executed by them.

The foregoing configuration/modeling, application and/or runtime databases are represented for illustrative purposes only by elements 52a-52e in the drawings. Though shown distributed among only several of the control devices 36-46 in the drawing, in practice these may be consolidated in fewer or distributed among more such devices or otherwise, all in the conventional manner known in the art.

As noted above, all or parts of the environment illustrated in FIG. 1 may be actual or simulated. Thus, by way of non-limiting example, processing stations 20a-20d, control devices 36-46, and configuration/modeling database may be actual, as may be their operation. Such is the case, for example, in an operational (or "up and running") factory or other environment. In such a case, application and/or runtime databases, e.g., 52a-52e, contain actual current and/or historical operational information. Construction and operation of an actual environment of the type illustratively depicted in FIG. 1 may be accomplished in a manner known in the art, as adapted in accord with the teachings hereof.

By way of further non-limiting example, processing stations 20a-20d, control devices 36-46, and configuration/modeling database may be actual, yet, their operation may be simulated. Such is the case, for example, in a pre-operational factory or other environment. In such a case, application and/or runtime databases, e.g., 52a-52e, contain at least some simulated current and/or historical operational information. Simulation of the operation an actual environment of the type illustratively depicted in FIG. 1 may be accomplished in a manner known in the art, as adapted in accord with the teachings hereof. Simulation of such operation, e.g., based on configuration/modeling database(s) and/or processing station specifications, may be performed using software packages available in the art, including, by way of non-limiting example, those based on the SIM4ME® simulation software available from the assignee hereof, as adapted in accord with the teachings hereof.

By way of still further non-limiting example, processing stations 20a-20d, control devices 36-46, and configuration/modeling database may be simulated, as may their operation. Such is the case, for example, in a factory or other environment that is under design. Simulation of processing stations and/or control devices may be performed using computer aided design and manufacturing packages of the type known in the art, while simulation of the operation of such stations and devices may be performed using software packages of the type discussed above, all as adapted in accord with the teachings hereof.

Figure 2:
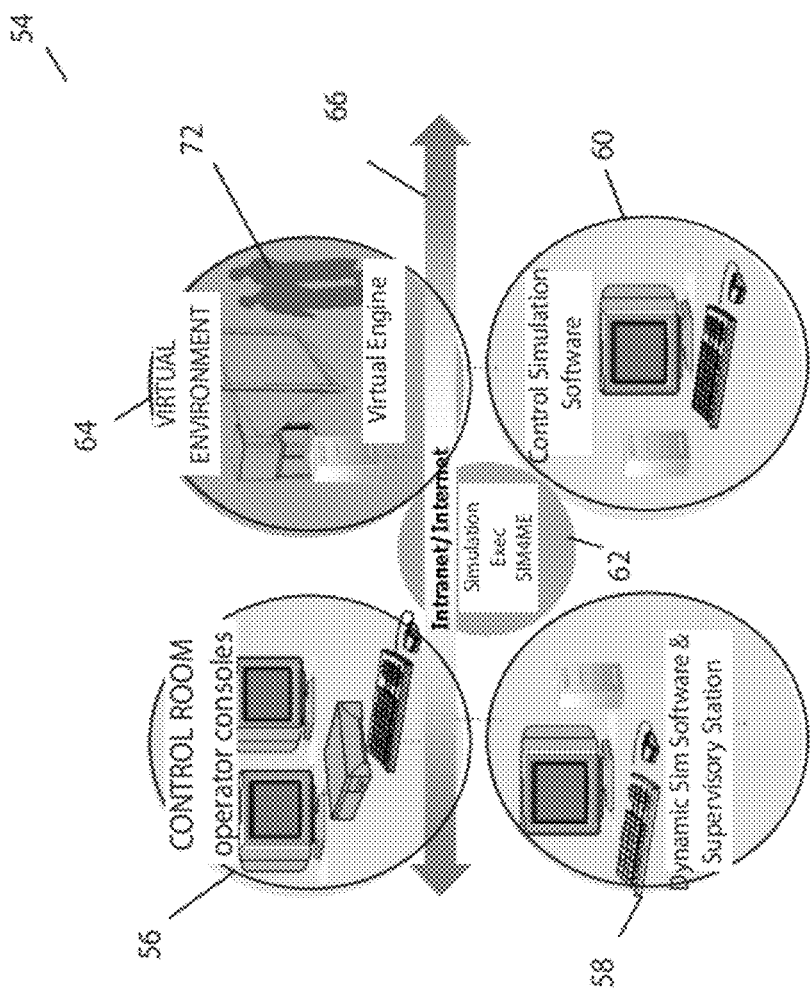
FIGS. 2-3 depicts a system according to the invention for immersive interaction with an environment of the type shown in FIG. 1.
Figure 3:
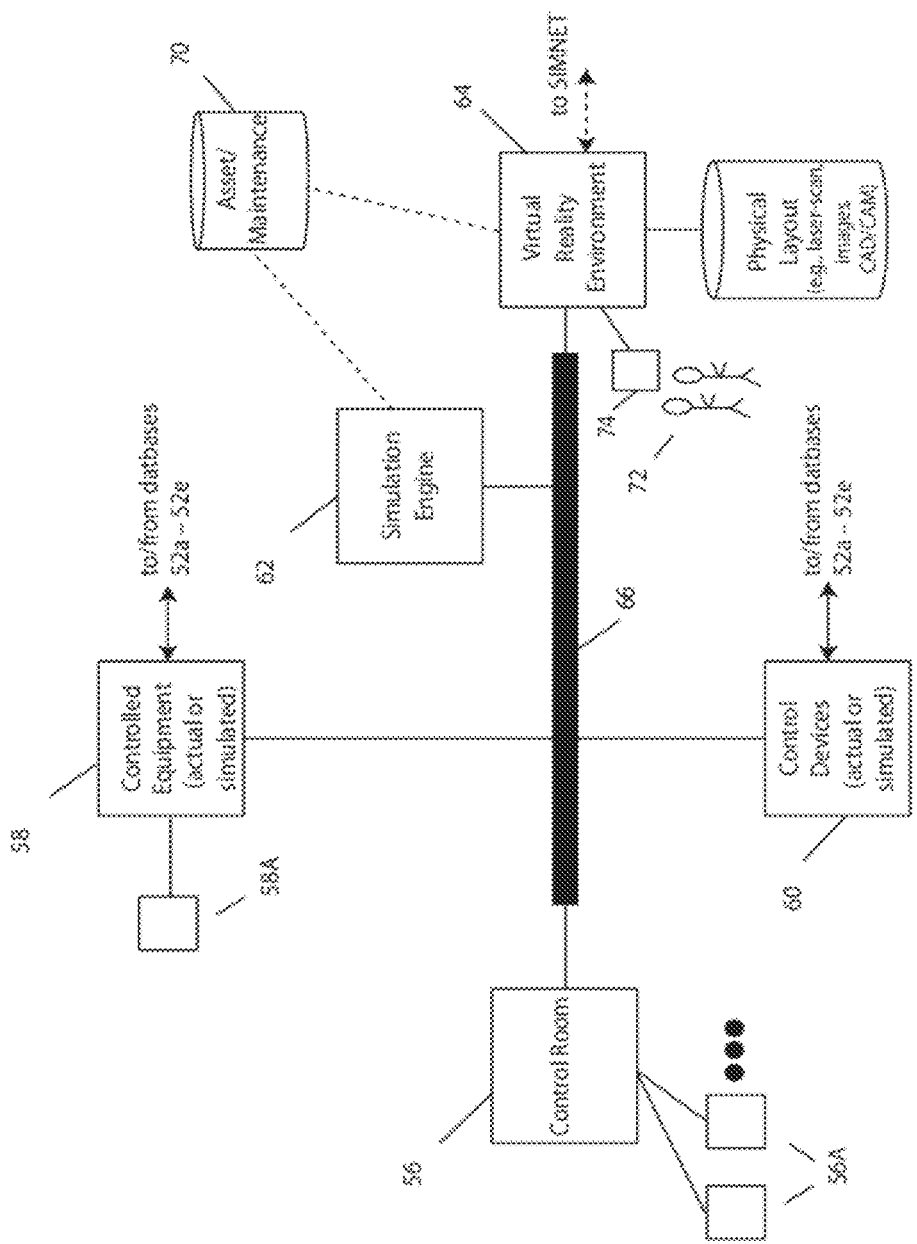

FIG. 2 depicts a system 54 according to the invention for immersive interaction with an environment 5 of the type described above. More particularly, illustrated system 54 provides for immersive interaction with a simulated such environment, though, it will be readily appreciated from the teachings hereof how such a system can be adapted for immersive interaction with an actual such environment.

Illustrated system 54 includes a control room 56 with operator console(s) 56A, dynamic simulation software 58 and workstation 58A, control device simulation software 60, a simulation engine 62, a virtual reality environment (including a VR engine) 64, coupled for communication via one or more networks 66 or otherwise. Other embodiments may include lesser or more elements and may be configured other than as shown here.

Illustrated control room 56 represents a conventional control room of the type used in connection with process control and other control technologies. In the illustrated embodiment, this can be used to monitor and control operational parameters of the simulated environment 5, e.g., in the same manner with which such a control room monitors and controls operational parameters of an actual environment 5. In this regard, control room 56 can be used to support training of personnel in virtual reality environment 64 and/or it itself (the control room) can be provide an environment for training (e.g., of control room personnel).

Dynamic simulation software 58 generates output representing the operational status of the plant and or other environment and more particularly, by way of non-limiting example, of the (one or more pieces of) controlled equipment 22-32 that make up the plant/environment. That software 58 represents dynamic simulation software of the type commercially available in the marketplace, as adapted in accord with the teachings hereof, though other simulation packages known in the art can be used, as well or instead (again, as adapted in accord with the teachings hereof). In addition to supporting activities of a training instructor (e.g., setting up training exercises for trainees in the virtual reality environment 64) via a supervisory workstation, the simulation software 58 includes "solver" and other simulation support tools to simulate operation of an actual plant or other environment. To this end, the simulation software 58 can include or otherwise be coupled to a configuration/modeling database 70 of the type described above that models, for example, the control system 10 and apparatus at the facility controlled by, as well as the materials or other things processed by them. Software 58 may execute on the aforesaid supervisory workstation and/or on other suitable digital data processing apparatus of the type known in the marketplace (including, by way of non-limiting example, the aforesaid control room workstations).

Control device simulation software 60 generates output representing the operational status of the control devices (e.g., 36-46, CTL and INT) used to monitor and/or control controlled equipment (e.g., 22-32). That software 58 simulates operation of controllers and other control devices of a simulated environment 5. The software 60 represents control simulation software of the type commercially available in the marketplace, as adapted in accord with the teachings hereof, though other simulation packages known in the art can be used, as well or instead (again, as adapted in accord with the teachings hereof). The simulation software 60 can include or otherwise be coupled to a configuration/modeling database (not shown) of the type described above that models, for example, control strategies executed by the simulated control devices. Software 60 may execute on a dedicated workstation of the type shown in the drawing and/or on other suitable digital data processing apparatus (including, by way of non-limiting example, the aforesaid supervisory workstation and/or control room workstations).

Simulation engine 62 works with and coordinates activities of the simulation software 58, 60 and control room workstations to simulate operation of an environment 5 of the type described above for incorporation into an immersive display of that environment (e.g., an immersive display of the physical layout of that environment) in virtual reality environment 64. In the illustrated embodiment, simulation engine represents a software package commercially available from the assignee hereof under the trade name SIM4ME, as adapted in accord with the teachings hereof—though other simulation engines available in the marketplace can be used, as well or instead (again, as adapted in accord with the teachings hereof).

Virtual reality environment 64 provides a three-dimensional or other immersive display of the environment 5, including not only the physical layout of that environment but also a reproduction of the operation of the control system 10 and apparatus at the facility controlled by it and, more particularly, by way of example, controlled equipment 22-32, the materials or other things processed by them, the processes by which they are processed, and/or the elements of the control system 10, including, for example, control devices 36-46. Simply put, in some embodiments, the virtual reality environment 64 provides an immersive display of the environment 5 that permits the trainee and/or other user (e.g., maintenance personnel, emergency first responders, and so forth) to experience walkthroughs and other interactions with the environment as if he/she were really there.

That display can be conveyed to participants 72—particularly, for example, trainees—via stereoscopic headgear of the type used for VR displays. Alternatively, or in addition, it can be displayed via projections on walls of a VR "room." In addition to display of the simulated environment 5, virtual reality environment 64 can provide sounds and other audible queues associated with that environment. Moreover, it can support trainee interaction with the simulated environment 5 via haptic devices, gaming devices (e.g., Nintendo Wii™ controllers), joysticks, wands, mice, keyboards and the like, all as represented in the drawings by input and output elements 74. Such devices can facilitate navigation and/or interactive manipulation of the simulated environment.

Virtual reality environment 64 accepts input from simulation engine 62 representing the status of the environment 5, including, of processing stations 20a-20d, controlled equipment 22-32, the materials or other things processed by them, the processes by which they are processed, and/or the elements of the control system 10, including, for example, control devices 36-46. The input may reflect that status for all aspect of the environment or portions thereof, e.g., the status of equipment, materials, control devices, etc., in a vicinity of the participant in the virtual "world" being displayed within VR environment 64.

In order to display the physical layout of the environment 5 to the participant, virtual reality environment 64 includes or is coupled with one or more databases that can include, by way of example, (i) a CAD/CAM representation of the processing stations 20a-20d, controlled equipment 22-32, and/or elements of the control system 10, including, for example, control devices 36-46 (or a portion/subset of one or more of the foregoing), (ii) a 3D laser scan-representation of the processing stations 20a-20d, controlled equipment 22-32, and/or elements of the control system 10, including, for example, control devices 36-46 (or a portion/subset of one or more of the foregoing), and/or (iii) 2D photographs of an actual or simulated environment 5 showing the processing stations 20a-20d, controlled equipment 22-32, and/or elements of the control system 10, including, for example, control devices 36-46 (or a portion/subset of one or more of the foregoing).

Virtual reality environment 64 can utilize one or more of those databases to construct immersive displays of the environment 5 and, thereby, to allow the participant to navigate through it and interact, for example, with the controlled equipment and control devices in it. Thus, for example, virtual reality environment 64 can utilize a database of thousands of actual (or simulated) photographs of a plant to display 3D "reconstructions" of it with sufficient realism to make the participant feel as if he/she is really there. Software for performing such reconstruction—or, more precisely, for generating a 3D virtual reality display from 2D images—is available in the marketplace under the trade name Studio Max™, although, other technologies providing such capabilities can be used instead or in addition.

Coupled with input from the simulation engine 62, this permits the participant not only to passively "walk through" the environment, but also to actively participate with it. Thus, actions (such as operating controlled equipment and/or control devices) by the participant in the virtual environment displayed to him/her are conveyed by the simulation engine 62 to software 58, 60 to discern how those actions effect changes in the simulated environment 5 (e.g., changes in levels in tanks, variables on display, etc.) which changes are, in turn, fed back by the simulation engine 62 to the virtual reality environment to generate variations in the VR display of the environment—thus, providing action-reaction feedback to the participant.

By way of non-limiting example, then, a trainee who uses a mouse or other input device to simulate opening a valve in the simulated environment displayed by the virtual reality environment 64 can see (and, with sound effects, hear) the results of that action, e.g., as reflected by VR-simulated displays of gauges on a downstream storage tank displayed in environment 64. Likewise, by way of further non-limiting example, a trainee and/or other user (e.g., maintenance personnel, emergency first responders, and so forth) who fails to react properly to an alarm signaled in the VR environment can witness, in the safety of the VR environment, the simulated rupture of a piece of equipment and resultant flood fire.

In some embodiments, the virtual reality environment 64 displays the simulated environment 5 not only as the participant would see it in actuality (i.e., as if he/she were really there), but also augments that display. This can include superimposing graphs, equations and other visual aids on controlled equipment and/or control devices (e.g., and particularly, for example, on those equipment/devices affected by the participants actions).

This can also include superimposing still and/or video images taken concurrently (e.g., in "real time") or at a prior time by fixed or mobile cameras, including, by way of non-limiting example, still or video cameras 90 (FIG. 1) that are mounted at known locations in or around environment 5 and/or such cameras that are part of mobile phones, PDAs and other such devices 92 carried by personnel 94 (e.g., maintenance personnel, emergency responders, and so forth) disposed in or around the environment 5. In this latter regard, GPS or other positioning signals generated by such mobile devices may be utilized to correlate still and video scenes with displays generated by environment 64 so that the still and/or video images may be appropriately placed in the display, e.g., on or near the corresponding controlled equipment and/or control devices.

Figure 4A:
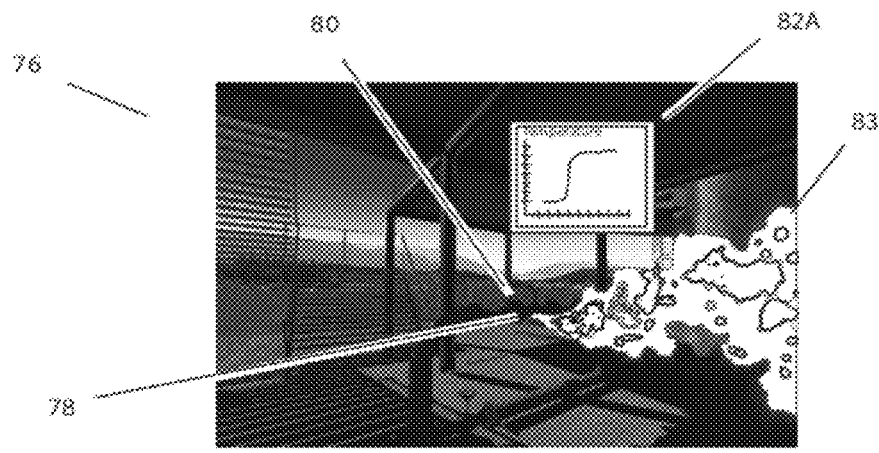
FIGS. 4A-4B depict displays of the type generated by systems according to the invention with an augmented display of controlled equipment and/or control devices.

An illustration showing one type of augmented display of the type described above is provided, by way of non-limiting example, in FIG. 4A, showing a display 76 of the type generated by virtual reality environment 64 representing controlled equipment 78 (here, a valve) and an actuator 80 that controls it. The figure also depicts a graphic—here, graph 82A—generated by virtual reality environment 64 to augment the display 76 of the control environment and, more specifically, to illustrate behavior of valve 78 and/or actuator 80 under a first set of simulated conditions. The display is further augmented with a fire-and-smoke graphic 83 to emphasize, in this instance, a practical consequence of dangerous equipment/device settings.

Augmented displays generated by the virtual reality environment can also include, by way of non-limiting example, altered the display of controlled equipment and/or control devices (or other aspects of the environment 5) to allow the participant to "see" into, through or around objects—something the participant would not be able to do in actuality. Returning to a preceding example, this "augmented" reality can be used, for example, to permit a trainee and/or other user (e.g., maintenance personnel, emergency first responders, and so forth) who uses a mouse or other input device to simulate opening a valve in the simulated environment to see through the walls of downstream storage tank as it fills with liquid.

The augmentation, whether in the form of superimposed graphics and/or see-through (or other altered-display) equipment, can be based on simulated and/or actual operational data for the controlled equipment and/or control devices (as well, as noted above, on still and/or video images acquired concurrently and/or at a prior time by cameras in or around the environment 5). This results in displays of the simulated environment that not only represent the behavior of the controlled equipment and/or control devices, but do so in a manner that is in agreement with actual or simulated conditions of the environment. Continuing the immediately preceding example, such augmented-reality displays generated by the virtual reality environment 64 permit a trainee and/or other user (e.g., maintenance personnel, emergency first responders, and so forth), for example, to see "through" the walls of the storage tank not only to see how opening a valve in the simulated environment causes a downstream storage tank to fill with liquid, but also to see how the rate-of-flow and viscosity of that liquid are affected temperatures, pressures and/or other actual (or simulated) conditions within the upstream and downstream equipment. This is similarly true, by way of example, in regard to the graph 82 shown in FIG. 4A.

In preferred embodiments, these experiences by participants in the virtual reality environment 64 can be connected with those of personnel in the control room 56. Thus, for example, the effects of actions taken by personnel in the control room can be witnessed by participants in the virtual reality environment 64, and vice versa. This can be utilized to improve the training, awareness and/or cooperation of all involved.

Further advantages of the systems and methods described above are that they provide for improved training and/or awareness by merging simulation, e.g., provided by software 58-62, and control room emulation, e.g., provided by control room 56, with 3D visualization, e.g, provided by virtual reality environment 64, based on real time computation, e.g., provided by software 58-62 to support bi-directional feedback between the participant and the simulated environment—or "action/reaction" mode interactions.

Such systems and methods can be used not only in support of training plant personnel, but also emergency responders, and others. In addition, they can be used on connection with maintenance and/or asset management functions of environment 5—particularly, where it is an actual (and not a simulated) environment. Thus, for example, personnel who are readying for a maintenance "run" through a plant can, first, take a simulated run in the virtual reality environment 64 representing it and, thereby, better familiarize and ready themselves for the actual maintenance run to follow. Such simulated runs can include not only VR displays of equipment to be maintained, upgrade and/or removed, but can also provide for simulated manipulation (e.g., removal) of that equipment using mice, game controllers or other input devices supplied with the environment 64.

The aforesaid utilization of system 54 in support of maintenance and/or asset management is supplemented, in some embodiments, by providing coupling the simulation engine 62 and/or VR environment 64 with "back office" asset and maintenance databases 70. The engine 62 and/or environment 62 can utilize information from those databases to highlight for plant personnel taking simulated run-throughs equipment to be worked or otherwise acted upon.

System 54 can, moreover, be coupled to SIMNET and/or other wireless (or wired networks) to facilitate identification of equipment in need of maintenance, upgrading and so forth. Thus, for example, by coupling the simulation engine 62 and/or VR environment 64 with SIMNET-generated data, the engine 62 and/or environment 62 can generate a VR display for plant personnel highlighting equipment requiring action.

System 54 can, still further, be utilized for people-tracking, e.g, in support of regular maintenance features as well as in support of emergency procedures. Thus, for example, by coupling the simulation engine 62 and/or VR environment 64 to a data stream indicating the location of personnel in the environment 5 (e.g., an actual plant), the engine 62 and/or environment 64 can generate a VR display for highlighting the location of personnel equipment requiring action. Such a data stream can be generated, by way of non-limiting example, based on GPS-, wireless-, RFID-, walkie-talkie-, or other technologies known in the art.

System 54 can be utilized both for team and individual training. Thus, as noted above, it can be used to coordinate the actions and communications of personnel in the virtual reality training environment 64 and control room 56. It can also be used to coordinate the actions and communications of multiple personnel in the virtual reality training environment 64. Conversely, it can be used to simultaneously training multiple such personnel in the virtual reality training environment 64, with any of their individual actions affecting the VR simulations displayed to the others.

Investigation and/or Analysis (e.g. VR Crisis Control Room)

As noted above, the virtual reality environment 64 can augment the display of the simulated environment 5, e.g., by superimposing graphics (including still and/or video images) on representations of the controlled equipment and/or control devices and/or by altering its presentation of that equipment and/or devices to allow the participant to "see" into, through or around them. In accord with the discussion of FIG. 4A, for example, the augmented displays can permit a trainee and/or other user to see how his or her actions affect behavior of the simulated environment 5, e.g., in light of actual (or simulated) conditions within the upstream and downstream equipment. Of course, it will be appreciated that such augmented displays can be used for other purposes, e.g., for investigation and/or analysis of simulated or actual operation of the environment 5, for maintenance and/or asset management, to name a few.

Augmented displays which show comparative operation of the environment and, more particularly, for example of the controlled equipment and/or control devices therein, can be used for the foregoing purposes and other purposes, as well. More particularly, by way of non-limiting example, augmented displays that allow the user to compare actual operation of the environment 5 with simulated operation of that environment 5—and, more particularly, by way of non-limiting example, to compare actual and simulated operation of one or more of the controlled equipment and/or control devices—can facilitate investigation and/or analysis of environment operation, e.g., for crisis control and other purposes. As above, such actual and/or simulated operation can be discerned from, for example, operational data maintained in application and/or runtime databases 52*a*-52 and/or from the configuration database 52*a*-52*e* and/or from cameras in or around the environment 5.

Figure 4B:
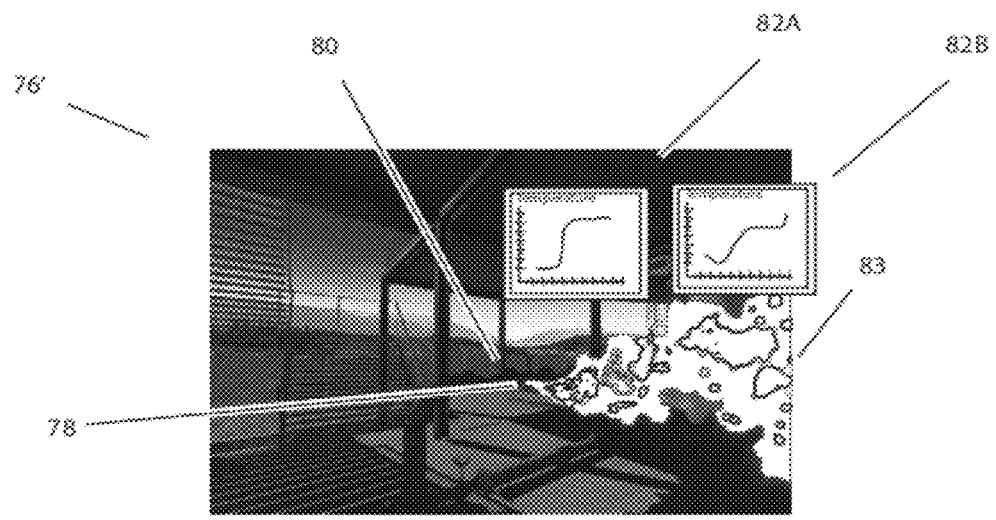

An example of an augmented display showing comparative operation, e.g., of actual and simulated operation of environment 5, is presented in FIG. 4B. The display 76' shows the same elements as display 76 of FIG. 4A, albeit, it includes— in addition to graph (or other graphic) 82A illustrating the simulated_behavior of valve 78 and/or actuator 80 under a first set of simulated conditions—a graph (or other graphic) 82B illustrating the behavior of that valve and/or actuator under a second set of those conditions. As above, the display is augmented with a fire-and-smoke graphic 83 indicating potential danger under the depicted conditions. By comparing these graphics 82A, 82B, the user (e.g., plant personnel, emergency first responders and/or others) can investigate and/or analyze potential faults (or improvements or other variances) in equipment/device operation.

The foregoing is by way of example. As noted, comparative operation can be used for other purposes, as well, e.g., training, planning (e.g., plant design), and so forth. Moreover, it will be appreciated that comparative operation may be shown in other ways, e.g., by other superimposed graphics, by see-through (or other altered-display) equipment/devices, and so forth. Thus, continuing the example of FIG. 4B, and without limitation, differing modes of operation of valve 78 and/or actuator 80 as effected by two different models of the environment 5 (from configuration database 52*a*-52*e*) may be shown by see-through (or other altered-display) depicts of that valve/actuator in the display 76'.

Example

A more complete understanding of the system 54 may be attained by reference to the discussion below, in which system 54 as practiced in one embodiment of the invention is alternatively referred to as "the System".

The System delivers a high-fidelity, unit-specific Immersive Training Simulator suitable for operating at operator-selected speeds (e.g., real-time or faster) and capable of training operators on start-up, shutdown, normal and/or faulted operations. The System includes one complete model of the reference plant including process and controls, a full set of instructor functions as well as the virtual plant environment. The System consists of the plant simulation, the control simulations, the Virtual Plant Environment (a/k/a virtual reality environment, simulation computer hardware, trainee hardware stations and the Instructor Station, as described in more detail below.

General

The System includes a Graphical User Interface (GUI) necessary to operate, and maintain a complete and fully functional the Immersive Training Simulator without the needs to recompile code when new module connections are made. Mathematical models with 3D graphical models of the system in object form determine the simulated behavior resembling reality so that complete control room operators and filed operators interactions are always possible. Simulated malfunctions are realistic "in nature" representing the result of defined equipment failures or other specifically defined causes.

The System is capable of performing the following:
replicate continuously, start-up, throughput changes, and shutdown. This may be performed at operator-selected speeds, e.g., real-time or faster (though it may be performed at slower speeds, as well, if the operator so desires). Indeed, in some embodiments, the System can replicate operator training simulation at three-times real-time speeds and higher. The System models malfunctions, together with System changes initiated through actions from the Instructor Station or from field operators;

for all units included in the System, simulations and virtual plant interactions are provided for those equipment that are operated from the control room and/or for the field and necessary to support all training objectives.

Plant Simulation

The simulator (a/k/a simulation engine 62) is capable of reproducing all modeled aspects of the reference plant. The mathematical models are based on first principles and generate all data and variables required for output to external devices or needed by other simulation systems. The simulator realistically responds to control room operator action during start-up, shutdown, or any normal and abnormal operation and malfunction condition, within the scope of the simulation.

Virtual Plant—VR ENGINE (a/k/a Virtual Reality Environment)

The purpose of the VR Engine is "to run" an environment that is photorealistic and richly detailed, with realistic "look and feel" objects and illuminations, but running in synchronism with the simulation engine 62 and, thus, for example, it can create the virtual (or simulated) environment at the operator-selected speeds (e.g., real-time or faster). A real time program gives the possibility to let the user move and interact freely within the environment, without being bound to pre-fixed paths or animations as it happens with a more conventional non-real time rendering. Graphics are adopted both to produce and to visualize 3D real time contents. Such technology permits the environment to be rendered 60 times per second, while a classic non-real time rendering approach can take one hour just to process/render one single frame of the environment. Collision geometry, interactive actions/reactions, trends popup or transparent equipments are available.

Control System Simulation

Control system simulation provides an identical representation and functionality of the distributed control system (DCS) configuration, logic and graphics as they are implemented in the real plant.

Instructor Station

A graphic-based instructor station provides the following control and monitoring features:

Run/Freeze.
Initialization.
Snapshot.
Backtrack.
Scenario.
Malfunction Initiation.
External Parameters and Instructor Controlled Variables.
Remote Functions.
Monitored Parameters.
Trending.
Trainee Proficiency Review.
Operators position tracking in the Virtual Plant.
Tracking the operator in the Virtual Plant Performance—Steady State Fidelity Steady state fidelity for the simulator relates to matching the model-predicted performance with reference plant data under full production values and turndown conditions. For the training simulator, the reference data is comprised of a steady state simulation of the plant using a steady state simulator for critical parameters. Plant measurement or equipment design data for non-critical parameters are used when not available from the steady state simulation.

Performance—Transient Fidelity

The system accurately simulates instructor-initiated transients such that an operator is not able to notice significant differences from the real plant, subject to the modeling scope defined herein. The critical and non-critical computed values correspond to the actual plant parameters in direction to those expected and will not violate the physical laws of nature.

Performance—System Accuracy

The dynamic precision and immersive "touch" of the ITS Models responses are such that operators and process engineers gain quantitative as well as qualitative process knowledge.

The System provides the trainees with a very realistic representation of the actual process units, in such a manner that there is no significant difference between operating on the System or the real plant.

Typically details on objects are available with accuracy as per "human view" at a distance of 25 cm.

Performance—Malfunctions

The System supports a wide range of malfunctions as standard. Malfunctions could impact control room operators, field operators or both. Typically, approximately up to five custom malfunctions can be selected for validation, since malfunction validation can be highly time-consuming for complex process.

Performance—Plant Design & Operating Limits

Events, which progress beyond plant design and operation limits, may be possible with the System In order to avoid 'negative' training that would result from operation during such events, indications are provided to alert the instructor when the certain parameters go outside design and operating limits.

Advantages the systems and methods as described above include the following

1. Increase production
  Reducing plant downtime due to better trained operators; reduces plant trips
  Reduced scheduled plant down time for maintenance by trained workers; you know what you have to expect on site and do not need to be trained on the job.
  Real time feedback from field operators on equipment status
2. Control material costs
  If this counts for maintenance you can reduce the required building material by better planning and train the task
  Augmented reality allows the operator in the virtual environment to see the process data by superimposing graphics on the controlled equipment and/or control devices, and/or by altering displays of the equipment/devices to give the user the impression of seeing into, through and/or around them. The superimposed graphics (e.g., still and/or video images, graphs, equations and the like) and/or altered displays of the equipment/devices can be based on simulated and/or actual operational data and/or fixed and/or mobile cameras, thereby, representing the behavior of the process equipment by animations that are in agreement with the data coming from the simulator (and/or the actual plant).
3. Control energy costs
4. Maintain plant safety and security
  All safety aspects by better trained operators; better trained contractors; better trained visitors from vendors
  Location tracking of all people in the plant
  Emergency task force training very valuable on remote operated areas or very hazard/contaminated areas
  Show how plant operators, etc., are actively working to mitigate risk in the areas of plant operation and safety of personnel
5. Ensure environmental and regulatory accountability
  EHS can only learn and train after a fatal accident; VR would allow you to do this in a save environment; train on scenarios you do not want to ever have in reality to be prepared.
  This technology hits the bulls-eye in a number of key areas of concern for clients:
6. Lower training costs and start-up time
7. Decrease environmental impact of use of actual or simulated environments, e.g., by decreasing the risks associated with unplanned releases into the atmosphere and other environmental contaminations.

Described above are systems and methods meeting the foregoing objects. It will be appreciated that the embodiment illustrated and described herein are merely examples of the invention and other embodiments incorporating changes thereto fall within the scope thereof. Thus, by way of non-limiting example, it will be appreciated that the augmented displays that include still and/or video images acquired by fixed and/or mobile cameras can be supplemented with or supplanted by sounds acquired by such cameras or audio acquisition equipment. In view thereof, what we claim is:

The invention claimed is:

1. A system having a control environment that includes controlled equipment and control devices that monitor and control that controlled equipment, the system including:
    first functionality generating output representing an operational status of one or more of said controlled equipment,
    second functionality generating output representing an operational status of one or more of said control devices,
    an engine, coupled to the first functionality and to the second functionality, that generates an operational status of the control environment, wherein said engine includes simulation functionality, the simulation functionality comprising dynamic simulation software,
    a virtual reality environment, coupled to the engine and to one or more representations of one or more physical aspects of the control environment, the virtual reality environment generating a three-dimensional ("3D") display of the control environment,
    the virtual reality environment being responsive to user interaction with one or more input devices to generate the 3D display of the control environment of the control environment so as to permit the user to interact with at least one of the control devices and the controlled equipment at least as represented by the 3D display of the control environment,
    the engine applying to at least one of the first and second functionality indicia of user interaction with at least one of the control devices and the controlled equipment to discern a resulting change in the operational status of the control environment, and the control engine applying indicia of such change to the virtual reality environment to effect corresponding variation in the 3D display of the control environment, and;
    wherein the first functionality includes a first simulation functionality that simulates the operation of one or more of the controlled devices and the second functionality includes a second simulation functionality that simulates operation of one or more the control devices, the input for the engine is said indicia.

2. The system of claim 1, wherein the virtual reality environment is coupled to a database comprising, as one or more representations of one or more physical aspects of the control, environment, a three-dimensional laser scan of at least a portion of the control environment including (i) on or more controlled equipment, (ii) one or more control devices.

3. The system of claim 1, wherein the virtual reality environment is coupled to a database comprising, as one or more representations of one or more physical aspects of the control environment, a plurality of two-dimensional images of at least a portion of the control environment including (i) on or more controlled equipment, (ii) one or more control devices.

4. The system of claim 3, wherein the virtual reality environment is coupled to functionality that generates a three-dimensional representation of the control environment from the plurality of two-dimensional images.

5. The system of claim 1, wherein the virtual reality environment includes a database comprising, as one or more representations of one or more physical aspects of the control environment, a computer-aided design/computer-aided manufacturing (CAD/CAM) representation of at least a portion of the control environment including (i) on or more controlled equipment, (ii) one or more control devices.

6. The system of claim 1, adapted to permit a user to experience, via the 3D display of the control environment, interaction with and travel through the control environment.

7. The system of claim 1, wherein the virtual reality environment augments the 3D display of the control environment by any of (i) superimposing graphics on representational displays of one or more controlled equipment and/or one or more control devices, and (ii) altering the representation of one or more of controlled equipment and/or one or more of the control devices to give the user the impression of seeing into, through and/or around objects.

8. The system of claim 7, wherein the virtual reality environment augments the 3D display of the control environment by superimposing graphics, including any of graphs, equations, still images, video images and other visual aids, on displays of one or more controlled equipment and/or one or more control devices.

9. The system of claim 7, wherein the virtual reality environment augments the 3D display of one or more controlled equipment and/or one or more control devices affected by the actions of the user.

10. The system of claim 7, wherein the virtual reality environment augments the 3D display of the control environment based on one or more of (i) simulated and/or actual operational data for one or more of the controlled equipment and/or one or more of the control devices, and (ii) still and/or video images acquired any of in or around the control environment.

11. The system of claim 1, wherein one or more of the control devices comprise actuator-type field devices, sensor-type field devices, interface devices and/or controllers.

12. The system of claim 1, wherein the first simulation function is dynamic simulation.

13. The system of claim 2, wherein the second simulation function is dynamic simulation.

14. A system having a control environment that includes controlled equipment and control devices that monitor and control that controlled equipment, the system including:
first functionality generating output representing an operational status of a plant or other environment that includes one or more of said controlled equipment,
second functionality generating output representing an operational status of one or more of said control devices,
one or more databases coupled to any of the first functionality and the second functionality, the one or more databases including any of configuration and a modeling database ("configuration" database), an application database and a runtime database,
an engine, coupled to the first functionality and to the second functionality, that generates an operational status of the control environment, wherein said engine includes simulation functionality, the simulation functionality comprising dynamic simulation software,
a virtual reality environment, coupled to the engine and to one or more representations of one or more physical aspects of the control environment, the virtual reality environment generating a three-dimensional display of the control environment,
the virtual reality environment being responsive to user interaction with one or more input devices to generate the 3D display of the control environment so as to permit the user to interact with at least one of the control devices and the controlled equipment at least as represented by the 3D display of the control environment,
the engine applying to the at least one of the first and second functionality indicia of user interaction with at least one of the control devices and the controlled equipment to discern changes on the operational status of the control environment, and the control engine applying indicia of those changes to the virtual reality environment to effect variation in the 3D display of the control environment, and;
wherein the first functionality includes a first simulation functionality that simulates the operation of one or more of the controlled devices and the second functionality includes a second simulation functionality that simulates operation of one or more the control devices, the input for the engine is said indicia.

15. The system of claim 14, wherein the configuration database contains one or more control strategies for one or more of the controlled equipment and/or one or more of the control devices.

16. The system of claim 14, wherein one or more of the databases includes simulated and/or actual current operational data for one or more of the controlled equipment and/or one or more of the control devices and/or one or more of the controlled equipment.

17. The system of claim 14, wherein one or more of the databases includes simulated and/or actual historical operational data for the control devices and/or one or more of the controlled equipment.

18. The system of claim 14, in which all or parts of the control environment may be any of actual or simulated.

19. The system of claim 14, wherein the first functionality comprises dynamic simulation functionality that simulates operation of one or more of the controlled equipment.

20. The system of claim 19, wherein the dynamic simulation functionality comprises a solver or other system for solving mathematical systems of equations and/or to other simulate operation of a control environment.

21. The system of claim 14, wherein the second functionality comprises software or other functionality that simulates operation of one or more of the control devices.

22. The system of claim 14, wherein one or more of the control devices comprise actuator-type field devices, sensor-type field devices, interface devices and/or controllers.

23. A system having a control environment that includes controlled equipment and control devices that monitor and control that controlled equipment, the system including:

first functionality generating output representing an operational status of a plant or other environment that includes one or more of said controlled equipment, second functionality generating output representing an operational status of one or more of said control devices, one or more databases coupled to any of the first functionality and the second functionality, the one or more databases including any of configuration and a modeling database ("configuration" database), an application database and a runtime database, an engine, coupled to the first functionality and to the second functionality, that generates an operational status of the control environment, wherein said engine includes simulation functionality, the simulation functionality comprising dynamic simulation software, a virtual reality environment, coupled to the engine and to one or more representations of one or more physical aspects of the control environment, the virtual reality environment generating a three-dimensional display of the control environment, the virtual reality environment being responsive to user interaction with one or more input devices to generate the 3D display of the control environment so as to permit the user to interact with at least one of the control devices and the controlled equipment at least as represented by the 3D display of the control environment, the engine applying to the at least one of the first and second functionality indicia of user interaction with at least one of the control devices and the controlled equipment to discern changes on the operational status of the control environment, and the control engine applying indicia of those changes to the virtual reality environment to effect variation in the 3D display of the control environment, a control room digital data processor, coupled to any of the engine and the virtual reality environment, that monitors and/or controls user interaction with at least one of the control devices and the controlled equipment at least as represented by the 3D display of the control environment, and;

wherein the first functionality includes a first simulation functionality that simulates the operation of one or more of the controlled devices and the second functionality includes a second simulation functionality that simulates operation of one or more the control devices, the input for the engine is said indicia.

24. The system of claim 23, wherein the control room digital data processor is adapted to enable users thereof to witness effects of interaction between users of the virtual reality environment with respect to at least one of the control devices and the controlled equipment at least as represented by the 3D display of the control environment.

25. The system of claim 24, wherein the virtual reality environment is adapted to enable users thereof to witness effects of actions by users of the control room digital data processor.

26. The system of claim 23, wherein one or more of the control devices comprise actuator-type field devices, sensor-type field devices, interface devices and/or controllers.

27. A method of interaction with a control environment that includes controlled equipment and control devices that monitor and control that controlled equipment, the method comprising: generating first functionality output representing an operational status of one or more of said controlled equipment, generating second functionality output representing an operational status of one or more of said control devices, an engine, coupled to the first functionality and to the second functionality, that generates an operational status of the control environment, wherein said engine includes simulation functionality, the simulation functionality comprising dynamic simulation software, a virtual reality environment, coupled to the engine and to one or more representations of one or more physical aspects of the control environment, the virtual reality environment generating a three-dimensional ("3D") display of the control environment, the virtual reality environment being responsive to user interaction with one or more input devices to generate the 3D display of the control environment of the control environment so as to permit the user to interact with at least one of the control devices and the controlled equipment at least as represented by the 3D display of the control environment, the engine applying to at least one of the first and second functionality indicia of user interaction with at least one of the control devices and the controlled equipment to discern a resulting change in the operational status of the control environment, and the control engine applying indicia of such change to the virtual reality environment to effect corresponding variation in the 3D display of the control environment, and; wherein the first functionality includes a first simulation functionality that simulates the operation of one or more of the controlled devices and the second functionality includes a second simulation functionality that simulates operation of one or more the control devices, the input for the engine is said indicia.

28. The method of claim 27, wherein step (A) includes utilizing one or more databases including any of configuration and a modeling database ("configuration" database), an application database and a runtime database to determine any of an operational status of the one or more of controlled equipment and the one or more control devices.

29. The method of claim 27, comprising
tracking positions of one or more persons with respect to the control environment at least as represented by the 3D display thereof, and wherein
the generating step include generating the 3D display to indicate one or more of those positions of those persons.

30. The method of claim 27, wherein the generating step includes augmenting the 3D display of the control environment by any of (i) superimposing graphics on representational displays of one or more controlled equipment and/or one or more control devices, and (ii) altering the representation to give the user the impression of seeing into, through and/or around objects.

* * * * *

UNITED STATES PATENT AND TRADEMARK OFFICE
CERTIFICATE OF CORRECTION

| | | |
|---|---|---|
| PATENT NO. | : 8,594,814 B2 | Page 1 of 1 |
| APPLICATION NO. | : 12/487792 | |
| DATED | : November 26, 2013 | |
| INVENTOR(S) | : Rovaglio et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this
Fourteenth Day of April, 2015

Michelle K. Lee
*Director of the United States Patent and Trademark Office*